United States Patent
Ichihashi et al.

(10) Patent No.: US 7,851,031 B2
(45) Date of Patent: Dec. 14, 2010

(54) OPTICALLY-ANISOTROPIC FILM AND LIQUID-CRYSTAL DISPLAY DEVICE

(75) Inventors: Mitsuyoshi Ichihashi, Minami-ashigara (JP); Yuta Takahashi, Minami-ashigara (JP); Hideyuki Nishikawa, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 601 days.

(21) Appl. No.: 11/860,582

(22) Filed: Sep. 25, 2007

(65) Prior Publication Data

US 2008/0075892 A1   Mar. 27, 2008

(30) Foreign Application Priority Data

Sep. 25, 2006  (JP) .............................. 2006-258277

(51) Int. Cl.
*G02B 5/30* (2006.01)
*G02F 1/13363* (2006.01)

(52) U.S. Cl. ........................... 428/1.1; 349/75; 349/117; 428/1.3

(58) Field of Classification Search .................. 428/1.1, 428/1.31; 349/75, 117
See application file for complete search history.

(56) References Cited

U.S. PATENT DOCUMENTS

2003/0090619 A1 * 5/2003 Kumagai et al. ............. 349/194
2008/0113112 A1 * 5/2008 Ikeda et al. .................. 428/1.1

FOREIGN PATENT DOCUMENTS

| JP | 10-068816 A | 3/1998 |
| JP | 10-090521 A | 4/1998 |
| JP | 2000-321576 A | 11/2000 |
| JP | 2001-004837 A | 1/2001 |
| JP | 2003075795 A * | 3/2003 |
| JP | 2005134466 A * | 5/2005 |
| WO | WO 2007029771 A1 * | 3/2007 |

* cited by examiner

*Primary Examiner*—Shean C Wu
(74) *Attorney, Agent, or Firm*—Buchanan Ingersoll & Rooney PC

(57) ABSTRACT

A novel optically-anisotropic film is disclosed. The film is formed of a composition comprising at least one discotic liquid-crystal compound having a ratio, $\alpha 1$, which is a ratio of birefringence at 400 nm to birefringence at 550 nm in a liquid-crystal state, of less than 1.25, in which the molecules of the liquid-crystal compound are fixed in an alignment state at a mean tilt angle ranging from 35 to 85°, wherein its in-plane retardation Re, as measured in a direction normal to a plane of the optically-anisotropic film for 550 nm wavelength light, falls within the range from 60 nm to 220 nm.

9 Claims, 2 Drawing Sheets

OPTICALLY-ANISOTROPIC FILM AND LIQUID-CRYSTAL DISPLAY DEVICE

CROSS-REFERENCE TO RELATED APPLICATIONS

This application claims benefit of priority under 35 U.S.C. 119 to Japanese Patent Application No. 2006-258277, filed Sep. 25, 2006, and the entire content of the application is incorporated herein by reference.

BACKGROUND OF THE INVENTION

1. Field of the Invention

The present invention relates to an optically-anisotropic film usable in various displays (for example, transmissive-type and reflective/transmissive-type liquid-crystal display devices for use in OA appliances and mobile terminals) and pickups for optical discs, and to a liquid-crystal display device such as transmissive-type and reflective/transmissive-type devices.

2. Related Art

λ/4 plates have a great many applications, and are already used in reflective-type LCDs, pickups for optical discs and PS conversion devices. However, most of so-called λ/4 plates achieve λ/4 within a specific wavelength range. For achieving λ/4 within a broader wavelength range, proposed is a technique of laminating two optically-anisotropic polymer films (for example, see Japanese Patent Application Laid-Open Publication Nos. 10-68816 and 10-90521). Also proposed is a retardation plate constructed by laminating a polymer film having a retardation of λ/4 and a polymer film having a retardation of λ/2 in such a manner that their slow axes cross each other (for example, see Japanese Patent Application Laid-Open Publication No. 10-68816). Further proposed is a retardation plate constructed by laminating at least two retardation plates having a retardation of from 160 to 320 nm in such a manner their slow axes are not in parallel but cross at an angle not at a right angle (for example, see Japanese Patent Application Laid-Open Publication No. 10-90521). These retardation plates achieve λ/4 within a broad wavelength range, comprising two polymer films. On the other hand, disclosed is a thinned, broad-band λ/4 plate constructed by laminating plural optically-anisotropic layers formed of liquid-crystalline molecules (for example, see Japanese Patent Application Laid-Open Publication Nos. 2001-4837 and 2000-321576).

SUMMARY OF THE INVENTION

Examples of these retardation plates may act as a λ/4 plate by controlling their retardation in the normal direction to be on a suitable level, but when combined with a liquid-crystal cell to be in a liquid-crystal display device, they are problematic in that their retardation may shift from λ/4 in the oblique direction, therefore resulting in contrast reduction, since the retardation of liquid-crystal cell and that of the optically-anisotropic layer both have viewing angle dependency. Specifically, conventional λ/4 plates do not have a function of compensating the viewing angle of liquid-crystal cells, and it is desired to propose a λ/4 plate applicable to a broader viewing angle.

An object of the invention is to provide an optically-anisotropic film capable of functioning as a λ/4 plate applicable to a broader viewing angle.

Another object of the invention is to provide a liquid-crystal display device of which the producibility is good and which may display high-contrast images in a broad viewing angle range.

In one aspect, the present invention provides an optically-anisotropic film formed of a composition comprising at least one discotic liquid-crystal compound having a ratio, α1, which is a ratio of birefringence at 400 nm to birefringence at 550 nm in a liquid-crystal state, of less than 1.25, in which the molecules of the liquid-crystal compound are fixed in an alignment state at a mean tilt angle ranging from 35 to 85°, wherein its in plane retardation Re, as measured in a direction normal to a plane of the optically-anisotropic film for 550 nm-wavelength light, falls within the range from 60 nm to 220 nm.

The discotic liquid-crystal compound may be selected from a following formula (DI) or a following formula (I):

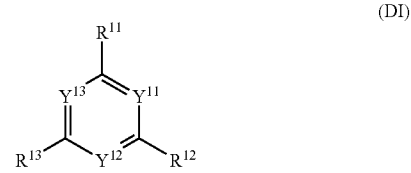

(DI)

wherein $Y^{11}$, $Y^{12}$ and $Y^{13}$ each independently represents a methine or a nitrogen atom; $R^{11}$, $R^{12}$ and $R^{13}$ each independently represents a following formula (DI-A), (DI-B) or (DI-C):

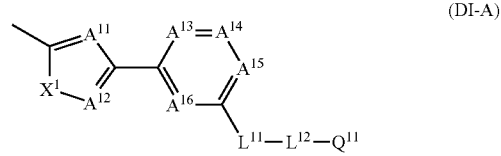

(DI-A)

wherein $A^{11}$, $A^{12}$, $A^{13}$, $A^{14}$, $A^{15}$ and $A^{16}$ each independently represents a methine or a nitrogen atom; $X^1$ represents an oxygen atom, a sulfur atom, a methylene or an imino; $L^{11}$ represents —O—, —O—CO—, —CO—O—, —O—CO—O—, —S—, —NH—, —SO$_2$—, —CH$_2$—, —CH=CH— or —C≡C—; $L^{12}$ represents a divalent linking group selected from a group consisting of —O—, —S—, —C(=O)—, —SO$_2$—, —NH—, —CH$_2$—, —CH=CH— and —C≡C—, and their any combinations; when the above group is a group having a hydrogen atom, the hydrogen atom may be substituted with a substituent; $Q^{11}$ independently represents a polymerizable group or a hydrogen atom;

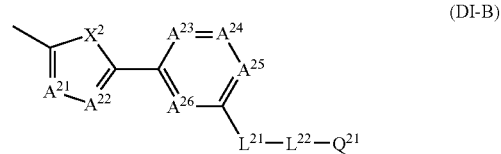

(DI-B)

wherein $A^{21}$, $A^{22}$, $A^{23}$, $A^{24}$, $A^{25}$ and $A^{26}$ each independently represents a methine or a nitrogen atom; $X^2$ represents an oxygen atom, a sulfur atom, a methylene or an imino; $L^{21}$ represents —O—, —O—CO—, —CO—O—, —O—CO—O—, —S—, —NH—, —SO$_2$—, —CH$_2$—, —CH=CH— or —C≡C—; $L^{22}$ represents a divalent linking group selected from a group consisting of —O—, —S—, —C(=O)—, —SO$_2$—, —NH—, —CH$_2$—, —CH=CH— and —C≡C—, and their any combinations; when the above group is a group having a hydrogen atom, the hydrogen atom may be substituted with a substituent; $Q^{21}$ independently represents a polymerizable group or a hydrogen atom;

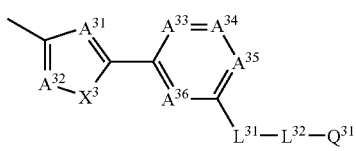
(DI-C)

wherein $A^{31}$, $A^{32}$, $A^{33}$, $A^{34}$, $A^{35}$ and $A^{36}$ each independently represents a methine or a nitrogen atom; $X^3$ represents an oxygen atom, a sulfur atom, a methylene or an imino; $L^{31}$ represents —O—, —O—CO—, —CO—O—, —O—CO—O—, —S—, —NH—, —SO$_2$—, —CH$_2$—, —CH=CH— or —C≡C—; $L^{32}$ represents a divalent linking group selected from a group consisting of —O—, —S—, —C(=O)—, —SO$_2$—, —NH—, —CH$_2$—, —CH=CH— and —C≡C—, and their any combinations; when the above group is a group having a hydrogen atom, the hydrogen atom may be substituted with a substituent; $Q^{31}$ independently represents a polymerizable group or a hydrogen atom;

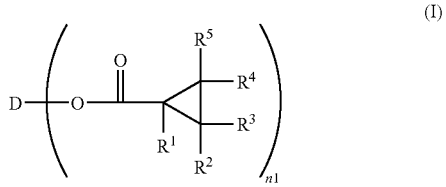
(I)

wherein D represents a triphenylene; n1 indicates an integer of from 3 to 6; $R^1$, $R^2$, $R^3$, $R^4$ and $R^5$ each independently represents a hydrogen atom, a substituted or non-substituted alkyl group having from 1 to 20 carbon atoms, a substituted or non-substituted alkenyl group having from 3 to 20 carbon atoms, a substituted or non-substituted alkoxy group having from 1 to 20 carbon atoms, a substituted or non-substituted alkenyloxy group having from 3 to 20 carbon atoms, a substituted or non-substituted aryl group having from 6 to 20 carbon atoms, a substituted or non-substituted aryloxy group having from 6 to 20 carbon atoms, or a substituted or non-substituted alkoxycarbonyl group having from 1 to 20 carbon atoms.

As embodiments of the invention, there are provided the optically-anisotropic film, wherein a ratio, α2, which is a ratio of retardation (Re) at 400 nm to Re at 550 nm, is less than 1.25; the optically-anisotropic film which comprises at least a region where the tilt angle of molecules of the liquid-crystal compound in the film varies along the direction of the thickness of the film; and the optically-anisotropic film, which comprises at least two layers formed of the composition respectively.

In another aspect, the present invention provides a liquid-crystal display device comprising at least a liquid-crystal cell and the optically-anisotropic film of the invention, which provides a black state while being applied with voltage, wherein the optically anisotropic film is disposed so that the mean direction of the axes, which are projected on the liquid-crystal cell substrate surface, of the director of the discotic liquid-crystal molecules therein is substantially parallel to the mean direction of the axes, which are projected on the liquid-crystal cell substrate surface, of the director of the liquid-crystal molecules in the liquid-crystal cell in a black state; and a liquid-crystal display device comprising a backlight disposed at a backside thereof, a pair of substrates, a liquid-crystal layer held between the pair of substrates and a color filter, with reflective regions and transmissive regions, wherein the optically-anisotropic film of the invention is disposed between the pair of substrates and in each of the transmissive regions, and retardation of each optically-anisotropic film varies depending on the wavelength of the color filter.

As an embodiment of the invention, there is provided the liquid-crystal display device, wherein the optically-anisotropic film is formed by jetting out a fluid comprising at least one liquid-crystal compound, onto the surface of a substrate through an inkjet-type head and drying it to give a liquid-crystal phase thereon, and fixing an alignment state of the liquid-crystal phase on the substrate;

Figure 1:
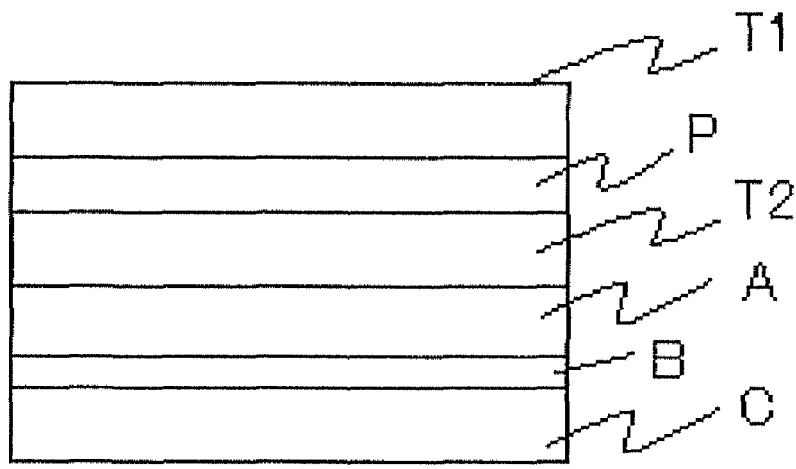
FIG. 1 is a cross-sectional view showing a typical embodiment of an elliptically-polarizing plate, produced in Examples.

In the drawings, the reference codes have the following meanings:
A: Optically-anisotropic layer C1
B: Optically-anisotropic layer B1 (optically-anisotropic film of the invention)
C: Optically-anisotropic layer A1
P: Linearly-polarizing film
P1: Lower linearly-polarizing film
P2: Upper linearly-polarizing film
T1: Protective film for linearly-polarizing film
T2: Protective film for linearly-polarizing film
LC: Liquid-crystal cell
D: Upper optically-anisotropic layer formed of Arton film (150 nm)
E: Upper optically-anisotropic layer formed of Arton film (260 nm)
a: Slow axis of optically-anisotropic layer C1
b: Slow axis of optically-anisotropic layer B1
d: Slow axis of upper optically-anisotropic layer formed of Arton film (150 nm)
e: Slow axis of upper optically-anisotropic layer formed of Arton film (260 nm)
p1, p2: Polarized light transmission axis

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof. In this description, the allowable range of an angle expressed as "substantially perpendicular" or "substantially parallel" is ±10°.

In this description, Re(λ) and Rth(λ) are an in-plane retardation (nm) and a thickness-direction retardation (nm), respectively, at a wavelength of λ. Re(λ) is measured by applying light having a wavelength of λ nm to a film in the normal direction of the film, using KOBRA 21ADH or WR (by Oji Scientific Instruments). Rth(λ) is calculated by KOBRA 21ADH or WR based on six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an a tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the Rth(λ) of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (1) and (2):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

$$Rth = \{(nx + ny)/2 - nz\} \times d \quad (2)$$

wherein Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness (nm) of the sample.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR. Based on thus-calculated nx, ny and nz, Nz=(nx−nz)/(nx−ny) is further calculated. It is to be noted that a measurement wavelength is 590 nm and any measurements are carried out under a condition of 25 degrees Celsius and 60% RH exceot as otherwise noted.

In this description, the term "a mean tilt angle of discotic liquid-crystal molecules in an optically-anisotropic layer" is defined as ((θ1+θ2)/2), in which a tilt angle θ1 is defined as an angle between one face of an optically-anisotropic film (in the optically-anisotropic film of the invention, this is the surface of the alignment layer therein) and the physical symmetric axis of a discotic liquid-crystal molecule in the optically-anisotropic film; and a tilt angle θ2 is defined as an angle between the other face (in the optically-anisotropic film of the invention, this is the interface of the layer to air) and the physical symmetric. However, it is difficult to accurately and directly measure θ1 and the tilt angle θ2 to the other face. Therefore, in this description, θ1 and θ2 are calculated as follows: This method could not accurately express the actual alignment state, but may be effective as a means for indicating the relative relationship of some optical characteristics of an optical film.

In this method, the following two points are assumed for facilitating the calculation, and the tilt angle at two interfaces of an optically-anisotropic film is determined.

1. It is assumed that an optically-anisotropic film is a multi-layered structure that comprises a layer containing discotic compounds. It is further assumed that the minimum unit layer constituting the structure (on the assumption that the tilt angle of the discotic compounds is uniform inside the layer) is an optically-monoaxial layer.

2. It is assumed that the tilt angle in each layer varies monotonously as a linear function in the direction of the thickness of an optically-anisotropic layer.

A concrete method for calculation is as follows:

(1) In a plane in which the tilt angle in each layer monotonously varies as a linear function in the direction of the thickness of an optically-anisotropic film, the incident angle of light to be applied to the optically-anisotropic film is varied, and the retardation is measured at three or more angles. For simplifying the measurement and the calculation, it is desirable that the retardation is measured at three angles of −40°, 0° and +40° relative to the normal direction to the optically-anisotropic film of being at an angle of 0°. For the measurement, for example, used are KOBRA-21ADH and KOBRA-WR (by Oji Scientific Instruments), and transmission ellipsometers AEP-100 (by Shimadzu), M150 and M520 (by Nippon Bunko) and ABR10A (by Uniopto).

(2) In the above model, the refractive index of each layer for normal light is represented by n0; the refractive index thereof for abnormal light is by ne (ne is the same in all layers as well as n0); and the overall thickness of the multi-layer structure is by d. On the assumption that the tilting direction in each layer and the monoaxial optical axis direction of the layer are the same, the tilt angle θ1 in one face of the optically-anisotropic layer and the tilt angle θ2 in the other face thereof are fitted as variables in order that the calculated data of the angle dependence of the retardation of the optically-anisotropic layer could be the same as the found data thereof, and θ1 and θ2 are thus calculated.

In this, n0 and ne may be those known in literature and catalogues. When they are unknown, they may be measured with an Abbe's refractometer. The thickness of the optically-anisotropic film may be measured with an optical interference thickness gauge or on a photograph showing the cross section of the layer taken by a scanning electronic microscope.

[Optically-Anisotropic Film]

The optically-anisotropic film of the invention is formed of a composition that comprises at least one discotic liquid-crystal compound having a ratio, 1, which is a ratio of birefringence (or in other words anisotropy of refractive indices) at 400 nm to birefringence at 550 nm in a liquid-crystal state, of less than 1.25, in which molecules of the liquid-crystal compound are fixed in an alignment state at a mean tilt angle ranging from 35 to 85°. And in-plane plane retardation Re of the film, as measured in the normal direction of the face of the optically-anisotropic film for 550 nm wavelength light, is from 60 nm to 220 nm. Various materials used in preparing the optically-anisotropic film of the invention will be described hereinafter.

[Discotic Liquid-Crystalline Compound]

The optically-anisotropic film of the invention is formed of a composition that comprises at least one discotic liquid-crystal compound having a ratio, 1, which is a ratio of birefringence at 400 nm to birefringence at 550 nm in a liquid-crystal state, of less than 1.25. Preferably, α1 is equal to or less than 1.22, more preferably equal to or less than 1.20. The value of α1 may be obtained by measuring birefringence of a liquid-crystal layer (thickness 1 μm) of vertically-aligned molecules of the discotic liquid-crystal compound at each wavelength. Preferred examples of the discotic liquid-crystal compound include discotic liquid-crystal compounds of the following formula (DI) or (I):

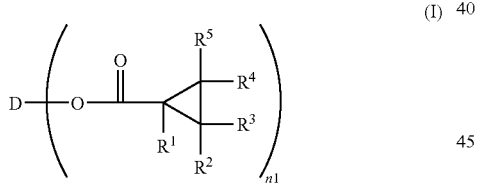
(I)

In formula (I), D represents a discotic core. The discotic core is positioned at the center of the discotic compound, and forms the discotic face of the compound. The meaning of the term "a discotic core" is a well-known concept in the field of the molecular structures of discotic liquid crystals. Examples of discotic liquid crystals are described in various documents such as C. Destrade et al., Mol. Crysr. Liq. Cryst., vol. 71, page 111 (1981); "Ekisho no Kagaku (Science of Liquid Crystal), edited by the Chemical Society of Japan, Seasonal Chemical Review No. 22, Chapter 5, and Chapter 10, Section 2 (1994); B. Kohne et al., Angew. Chem. Soc. Chem. Comm., page 1794(1985); and J. Zhang et al., J. Am. Chem. Soc., vol. 116, page 2655(1994).

Examples of the discotic core are shown below. Y in those compounds means the following formula (VI). In formula (VI), $R^1$, $R^2$, $R^3$, $R^4$ and $R^5$ have the same meanings as those in formula (I), and their preferred ranges are also the same as those therein.

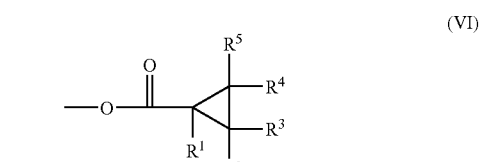
(VI)

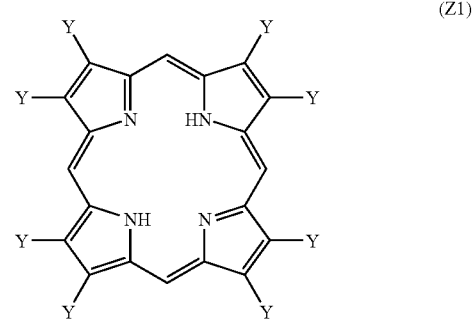
(Z1)

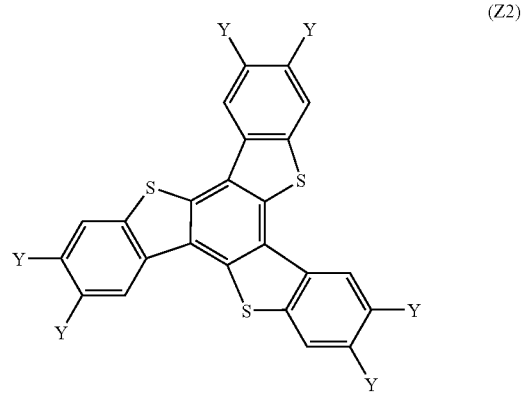
(Z2)

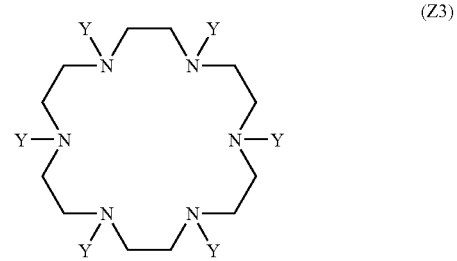
(Z3)

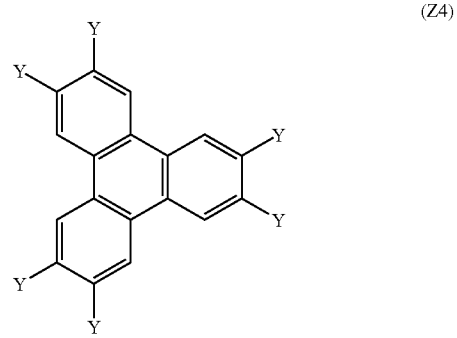
(Z4)

-continued
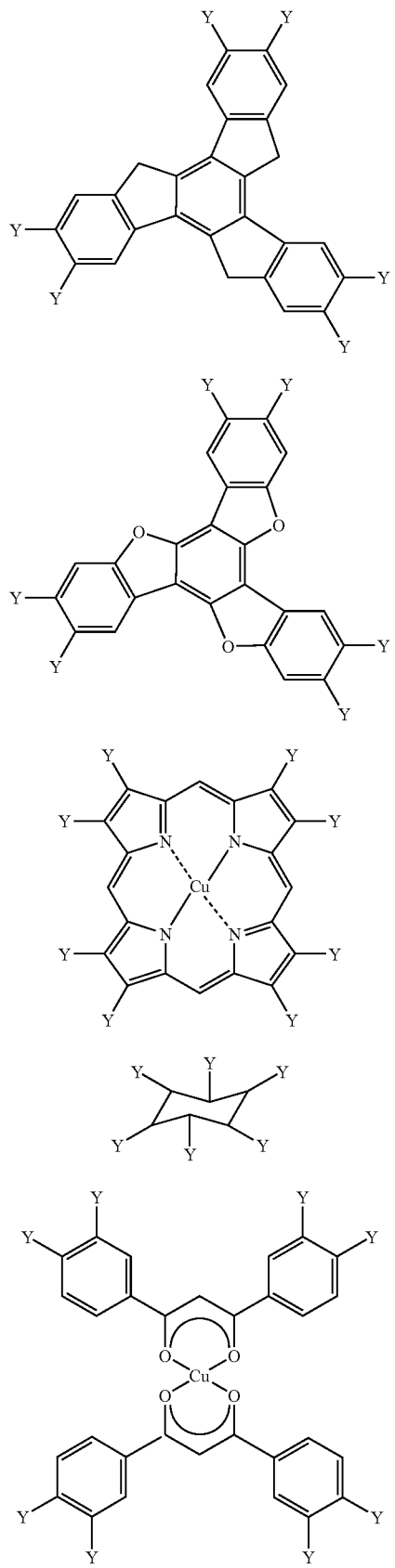
(Z5)
(Z6)
(Z7)
(Z8)
(Z9)
-continued
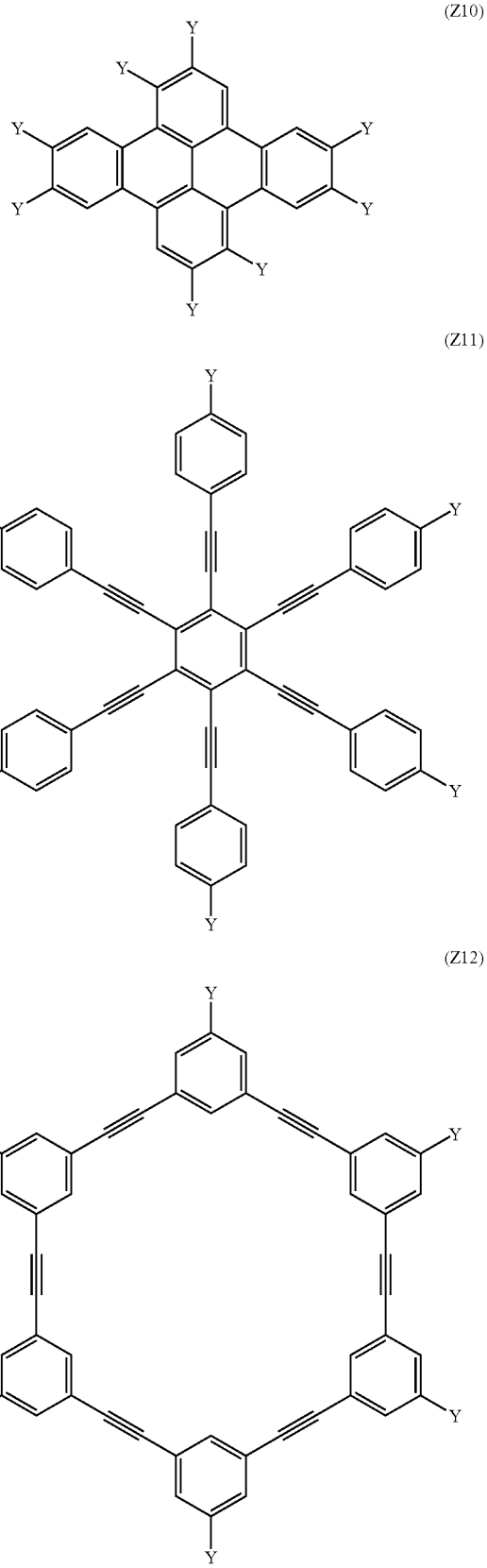
(Z10)
(Z11)
(Z12)

-continued

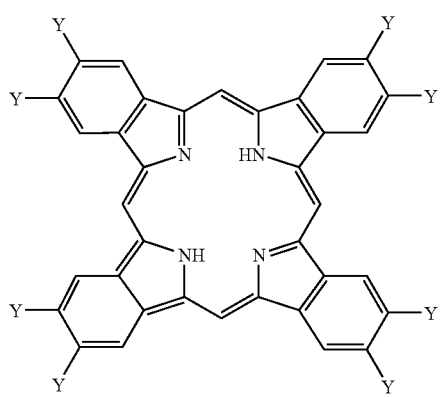
(Z13)

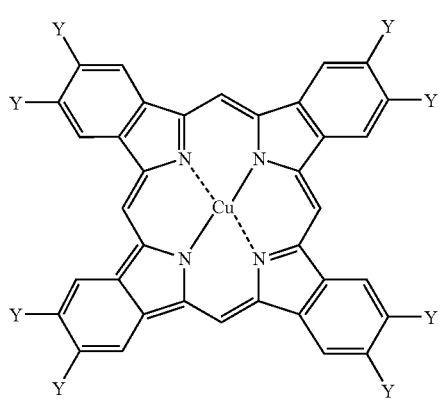
(Z14)

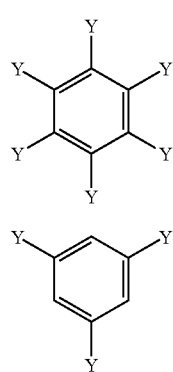
(Z15)

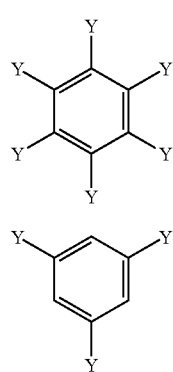
(Z16)

The discotic core (D) is preferably triphenylene (Z4).

The discotic core (D) may have at least one substituent other than Y, which is a substituent represented by formula (VI). Examples of the substituent, which the discotic core may have, include halogen atoms such as fluorine atom, a chlorine atom, a bromine atom and iodine atom; cyano, hydroxy, amino, carbamoyl, sulfamoyl, mercapto, ureido, alkyls, substituted alkyl groups, alkenyl groups, substituted alkenyl groups, alkynyl groups, substituted alkynyl groups, aryl groups, substituted aryl groups, heterocyclic groups, alkoxy groups, substituted alkoxy groups, aryloxy groups, substituted aryloxy groups, acyl groups, acyloxy groups, alkoxycarbonyl groups, substituted alkoxycarbonyl groups, aryloxycarbonyl groups, substituted aryloxycarbonyl groups, substituted amino groups, amido, imido, alkoxycarbonylamino groups, substituted alkoxycarbonylamino groups, aryloxycarbonylamino groups, substituted aryloxycarbonylamino groups, substituted carbamoyl groups, sulfonamide groups, substituted sulfamoyl groups, alkylthio groups, substituted alkylthio groups, arylthio groups, substituted arylthio groups, alkylsulfonyl groups, substituted alkylsulfonyl groups, arylsulfonyl groups, substituted arylsulfonyl groups, alkylsulfinyl groups, substituted alkylsulfinyl groups, arylsulfinyl groups, substituted arylsulfinyl groups, substituted ureide groups, amide phosphate groups, substituted silyl groups, alkoxycarbonyloxy groups, substituted alkoxycarbonyloxy groups, aryloxycarbonyl groups and substituted aryloxycarbonyl groups.

The alkyl group may have a cyclic or branched chain structure. The number of the carbon atoms in the alkyl group is preferably from 1 to 30. The alkyl moiety of the substituted alkyl group is defined as well as the alkyl group and the preferred scope thereof is same as that of the alkyl group. Examples of the substituent of the substituted alkyl group include those above exemplified as a substituent of the discotic core, except alkyl groups, substituted alkyl group, alkenyl group, substituted alkenyl groups, alkynyl groups and substituted alkynyl groups; and preferred examples thereof are also same as those.

The alkenyl group may have a cyclic or branched chain structure. The number of the carbon atoms in the alkenyl group is preferably from 2 to 30. The alkenyl moiety of the substituted alkenyl group is defined as well as the alkenyl group and the preferred scope thereof is same as that of the alkenyl group. Examples of the substituent of the substituted alkenyl group are same as those of the substituted alkyl group; and preferred examples thereof are also same as those of the substituted alkyl group. The alkynyl group may have a cyclic or branched chain structure. The number of the carbon atoms in the alkynyl group is preferably from 2 to 30. The alkynyl moiety of the substituted alkynyl group is defined as well as the alkynyl group and the preferred scope thereof is same as that of the alkynyl group. Examples of the substituent of the substituted alkynyl group are same as those of the substituted alkynyl group; and preferred examples thereof are also same as those of the substituted alkyl group.

The number of carbon atoms of the aryl group is preferably from 6 to 30. the aryl moiety of the substituted aryl group is defined as well as the aryl group and the preferred scope thereof is same as that of the aryl group. Examples of the substituent of the substituted aryl group include those above exemplified as a substituent of the discotic core; and preferred examples thereof are also same as those.

The heterocyclic group is preferably selected from 5-membered or 6-membered heterocyclic groups. Other ring(s) such as hetero ring(s), aliphatic ring(s) or aromatic ring(s) may be condensed with the heterocyclic ring. The hetero atom(s) embedded in the hetero ring is preferably selected from nitrogen, oxygen and sulfur atoms. The heterocyclic group may have at least one substituent. Examples of the substituent of the heterocyclic group include those above exemplified as a substituent of the discotic core; and preferred examples thereof are also same as those.

The alkyl moiety of the alkoxy group or the substituted alkoxy group is defined as well as the alkyl group; and the preferred scope thereof is same as that of the alkyl group. Examples of the substituent of the substituted alkoxy group are same as those of the substituted alkynyl group; and preferred examples thereof are also same as those of the substituted alkyl group. The aryl moiety of the aryloxy group or the substituted aryloxy group is defined as well as the aryl group; and the preferred scope thereof is same as that of the aryl group. Examples of the substituent of the substituted aryloxy group include those above exemplified as a substituent of the discotic core; and preferred examples thereof are also same as those.

The acyl group is a formyl or represented by —CO—R where R represents an alkyl group, a substituted alkyl group, an alkenyl group, a substituted alkenyl group, alkynyl group, substituted alkynyl group, aryl group or substituted aryl group.

The acyloxy group is a formyloxy or represented by —O—CO—R where R represents an alkyl group, a substituted alkyl group, an alkenyl group, a substituted alkenyl group, alkynyl group, substituted alkynyl group, aryl group or substituted aryl group.

The allyl moiety of the alkoxycarbonyl group or the substituted alkoxycarbonyl group is defined as well as the alkyl group. Examples of the substituent of the substituted alkoxycarbonyl group are same as those of the substituted alkyl group; and preferred examples thereof are also same as those of the substituted alkyl group.

The aryl moiety of the aryloxycarbonyl group or the substitute aryloxycarbonyl group is defined as well as the aryl group; and the preferred scope thereof is same as that of the aryl group. Examples of the substituent of the substituted aryloxycarbonyl group include those above exemplified as a substituent of the discotic core; and preferred examples thereof are also same as those.

The substituted amino group is represented by —NH—R or —N(—R)$_2$ where R represents an alkyl group, a substituted alkyl group, an alkenyl group, a substituted alkenyl group, alkynyl group, substituted alkynyl group, aryl group or substituted aryl group.

The amide group represented by —NH—CO—R where R represents an alkyl group, a substituted alkyl group, an alkenyl group, a substituted alkenyl group, alkynyl group, substituted alkynyl group, aryl group or substituted aryl group.

The imido group is represented by —N(—CO—R)$_2$ where R represents an alkyl group, a substituted alkyl group, an alkenyl group, a substituted alkenyl group, alkynyl group, substituted alkynyl group, aryl group or substituted aryl group.

The alkyl moiety of the alkoxycarbonylamino group or the substituted alkoxycarbonylamino group is defined as well as the alkyl group; and the preferred scope thereof is same as that of the aryl group. Examples of the substituent of the substituted aryloxycarbonylamino group are same as those of the substituted alkyl group; and preferred examples thereof are also same as those of the substituted alkyl group.

The aryl moiety of the aryloxycarbonylamino group or the aryloxycarbonylamino group is defined as well as the aryl group; and the preferred scope thereof is same as that of the aryl group. Examples of the substituent of the substituted aryloxycarbonylamino group include those above exemplified as a substituent of the discotic core; and preferred examples thereof are also same as those.

The substituted carbamoyl group is represented by —CO—NH—R or —CO—N(—R)$_2$ where R represents an alkyl group, a substituted alkyl group, an alkenyl group, a substituted alkenyl group, alkynyl group, substituted alkynyl group, aryl group or substituted aryl group.

The sulfonamide group represented by —NH—SO$_2$—R where R represents an alkyl group, a substituted alkyl group, an alkenyl group, a substituted alkenyl group, alkynyl group, substituted alkynyl group, aryl group or substituted aryl group. The substituted sulfamoyl group is represented by —SO$_2$—NH—R or —SO$_2$—N(—R)$_2$ where R represents an alkyl group, a substituted alkyl group, an alkenyl group, a substituted alkenyl group, alkynyl group, substituted alkynyl group, aryl group or substituted aryl group.

The alkyl moiety of the alkylthio group or the substituted alkylthio group is defined as well as the alkyl group; and the preferred scope thereof is same as that of the alkyl group. Examples of the substituent of the substituted alkylthio group are same as those of the substituted alkyl group; and preferred examples thereof are also same as those of the substituted alkyl group.

The arylthio moiety of the arylthio group or the substituted arylthio group is defined as well as the aryl group; and the preferred scope thereof is same as that of the aryl group. Examples of the substituent of the substituted arylthio group include those above exemplified as a substituent of the discotic core; and preferred examples thereof are also same as those.

The alkyl moiety of the alkylsulfonyl group or the substituted alkylsulfonyl group is defined as well as the alkyl group; and the preferred scope thereof is same as that of the alkyl group. Examples of the substituent of the substituted alkylsulfonyl group are same as those of the substituted alkyl group; and preferred examples thereof are also same as those of the substituted alkyl group.

The aryl moiety of the arylsulfonyl group or the substituted arylsulfonyl group is defined as well as the aryl group; and the preferred scope thereof is same as that of the aryl group. Examples of the substituent of the substituted arylsulfonyl group include those above exemplified as a substituent of the discotic core; and preferred examples thereof are also same as those.

The alkyl moiety of the alkylsulfinyl group or the substituted alkylsulfinyl group is defined as well as the alkyl group; and the preferred scope thereof is same as that of the alkyl group. Examples of the substituent of the substituted alkylsulfinyl group are same as those of the substituted alkyl group; and preferred examples thereof are also same as those of the substituted alkyl group.

The aryl moiety of the arylsulfinyl group or the substituted arylsulfinyl group is defined as well as the aryl group; and the preferred scope thereof is same as that of the aryl group. Examples of the substituent of the substituted arylsulfinyl group include those above exemplified as a substituent of the discotic core; and preferred examples thereof are also same as those.

The substituted ureido group is represented by —NH—CO—NH—R or —NH—CO—N(—R)$_2$ where R represents an alkyl group, a substituted alkyl group, an alkenyl group, a substituted alkenyl group, alkynyl group, substituted alkynyl group, aryl group or substituted aryl group.

The amide phosphate group is represented by —NH—O—P(=O)(—OH)—O—R or —NH—O—P(=O)(—O—R)$_2$ where R represents an alkyl group, a substituted alkyl group, an alkenyl group, a substituted alkenyl group, alkynyl group, substituted alkynyl group, aryl group or substituted aryl group.

The substituted silyl group is represented by —SiH$_2$—R, —SiH(—R)$_2$ or —Si(—R)$_3$ where R represents an alkyl group, a substituted alkyl group, an alkenyl group, a substituted alkenyl group, alkynyl group, substituted alkynyl group, aryl group or substituted aryl group.

The alkyl moiety of the alkoxycarbonyloxy group or the substituted alkoxycarbonyloxy group is defined as well as the alkyl group; and the preferred scope thereof is same as that of the alkyl group. Examples of the substituent of the substituted alkoxycarbonyloxy group are same as those of the substituted alkyl group; and preferred examples thereof are also same as those of the substituted alkyl group.

The aryl moiety of the aryloxycarbonyloxy group or the substituted aryloxycarbonyloxy group is defined as well as the aryl group; and the preferred scope thereof is same as that of the aryl group. Examples of the substituent of the substituted aryloxycarbonyloxy group include those above exemplified as a substituent of the discotic core; and preferred examples thereof are also same as those.

In formula (I), n1 indicates an integer of from 3 to 20, preferably an integer of from 3 to 15, more preferably an integer of from 3 to 12, even more preferably an integer of from 3 to 10, still more preferably an integer of from 4 to 8, most preferably 6.

In formula (I), $R^1$, $R^2$, $R^3$, $R^4$ and $R^5$ each represents a hydrogen atom or a substituent, and their examples may be the same as those of the substituent in the discotic core. Any two of $R^1$, $R^2$, $R^3$, $R^4$ and $R^5$ may bond to each other to form a ring. The ring is, for example, an aliphatic or aromatic ring. Preferably, $R^1$, $R^2$, $R^3$, $R^4$ and $R^5$ each independently represents a hydrogen atom, a substituted or non-substituted alkyl group, cyano, a substituted or non-substituted alkoxycarbonyl group, or a halogen atom.

Relative to the carbonyloxy group, $R^2$ and $R^3$, $R^4$ and $R^5$ are positioned in a cis/trans configuration. Cis means that the substituents are in the same direction as that of the carbonyloxy group relative to the cyclopropane ring face; and trans means that substituents are in the opposite direction to that of the carbonyloxy group relative to the cyclopropane ring face. Unless otherwise indicated, the positional relationship is not specifically defined.

Formula (I) may have enantiomer and diastereomer stereoisomers, depending on the combination of the substituents of $R^1$, $R^2$, $R^3$, $R^4$ and $R^5$; and unless otherwise indicated, these are not specifically defined.

The discotic compound of formula (I) is preferably represented by the following formula (II):

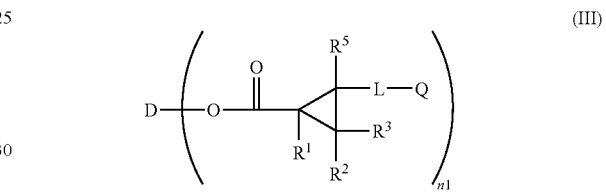

(II)

In formula (II), D represents a discotic core; n1 indicates an integer of from 3 to 20; $R^1$, $R^2$, $R^3$ and $R^5$ each represents a hydrogen atom or a substituent, and they may bond to each other to form a ring; m indicates an integer of from 1 to 5; and $R^6$ represents a substituent. When the formula has plural $R^6$'s, then they may be the same or different, and may bond to each other to form a ring.

The above D, n1, $R^1$, $R^2$, $R^3$ and $R^5$ are the same as D, n1, $R^1$, $R^2$, $R^3$ and $R^5$ defined in formula (I), and their preferred ranges are also the same as those in formula (I).

In formula (II), $R^6$ represents a substituent, and its examples are the same as those of the substituent for the discotic core. Preferred examples of $R^6$ are a halogen atom, a substituted or non-substituted alkyl group, a substituted or non-substituted alkoxy group, a substituted or non-substituted alkoxycarbonyl group, a substituted or non-substituted aryl group, a substituted or non-substituted aryloxy group, a substituted or non-substituted alkoxycarbonyloxy group, a substituted or non-substituted aryloxycarbonyloxy group or a substituted or non-substituted acyloxy group. More preferably, at least one $R^6$ is a substituted alkyl group, a substituted alkoxy group, a substituted alkoxycarbonyl group, a substituted aryl group, a substituted aryloxy group, a substituted alkoxycarbonyloxy group, a substituted aryloxycarbonyloxy group or a substituted acyloxy group, and the substituent has a polymerizable group at its terminal.

In formula (II), the substituent position of $R^6$ is not specifically defined, unless otherwise indicated. Preferably, at least one $R^6$ is in the para-position.

In formula (II), $R^5$ may be positioned in a cis/trans configuration relative to the carbonyloxy group. Unless otherwise indicated, the positional relationship is not specifically defined. Preferably, $R^5$ is in a cis configuration.

The discotic compound to be used in the invention, for example, the discotic compound of formula (I) may have a polymerizable group. The polymerizable group-having discotic compound (polymerizing discotic compound) may be fixed with the discotic face of the discotic compound kept aligned through polymerization.

In case where the compound of formula (I) has a polymerizable group, it is desirable that $R^4$ is a substituted alkyl group, a substituted alkoxy group, a substituted aryl group or a substituted aryloxy group, and the substituent has a polymerizable group at its terminal.

The polymerizing discotic compound is more preferably represented by the following formula (III):

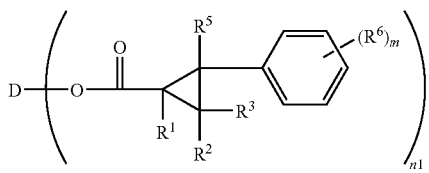

(III)

In formula (III), D represents a discotic core; n1 indicates an integer of from 3 to 20; $R^1$, $R^2$, $R^3$ and $R^5$ each represent a hydrogen atom or a substituent, and they may bond to each other to form a ring.

The above D, n1, $R^1$, $R^2$, $R^3$ and $R^5$ are the same as D, n1, $R^1$, $R^2$, $R^3$ and $R^5$ defined in formula (I), and their preferred ranges are also the same as those in formula (I).

In formula (III), L represents a divalent linking group selected from an oxygen atom, a sulfur atom, a carbonyl group, a substituted or non-substituted alkylene group, a substituted or non-substituted arylene group, and their any combinations.

The alkylene group may have a cyclic structure or a branched structure. Preferably, the alkylene group has from 1 to 30 carbon atoms.

The alkylene moiety of the substituted alkylene group may be the same as the alkylene group. Examples of the substituent of the substituted alkylene group are the same as those of the substituent of the discotic core described in formula (I), but not including an alkyl group, a substituted alkyl group, an alkenyl group, a substituted alkenyl group, an alkynyl group and a substituted alkynyl group.

Preferably, the arylene group has from 1 to 30 carbon atoms. The arylene group is preferably phenylene or naphthylene, more preferably phenylene, most preferably p-phenylene.

The arylene moiety of the substituted arylene group may be the same as the arylene group. Examples of the substituent of the substituted alkylene group are the same as those of the substituent of the discotic core described in formula (I).

In formula (III), Q represents a polymerizable group. The polymerizable group is more preferably an epoxy group or an ethylenic unsaturated group, most preferably an ethylenic unsaturated group (e.g., vinyl, 1-propenyl, isopropenyl).

Especially preferably, the discotic compound to be used in the invention is a triphenylene compound of the following formula (IV):

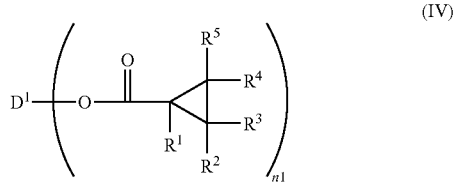

In formula (IV), $D^1$ represents triphenylene; n1 indicates an integer of from 3 to 6; $R^1$, $R^2$, $R^3$, $R^4$ and $R^5$ each represent a hydrogen atom, a cyano, a halogen atom, a substituted or non-substituted alkyl group having from 1 to 20 carbon atoms, a substituted or non-substituted alkenyl group having from 3 to 20 carbon atoms, a substituted or non-substituted alkoxy group having from 1 to 20 carbon atoms, a substituted or non-substituted alkenyloxy group having from 3 to 20 carbon atoms, a substituted or non-substituted aryl group having from 6 to 20 carbon atoms, a substituted or non-substituted aryloxy group having from 6 to 20 carbon atoms, or a substituted or non-substituted alkoxycarbonyl group having from 1 to 20 carbon atoms. The definitions and the examples of these groups are the same as those in formula (I), and their preferred ranges are also the same as those in formula (I).

In formula (IV), preferably, $R^1$, $R^2$, $R^3$ and $R^5$ each are a hydrogen atom, a methyl group, an ethyl group, a methyloxy group, an ethyloxy group, a cyano group, a halogen atom, or a substituted or non-substituted alkoxycarbonyl group.

In formula (IV), preferably, $R^4$ is a substituted or non-substituted aryl group having from 6 to 20 carbon atoms. In formula (IV), preferably, $R^4$ is in a trans-configuration relative to the carbonyloxy group.

The triphenylene compound of formula (IV) may have a polymerizable group. The polymerizable group-having triphenylene compound (polymerizing triphenylene compound) may be fixed with its discotic face of triphenylene kept aligned through polymerization.

In case where the compound of formula (IV) has a polymerizable group, it is desirable that $R^4$ is a substituted alkyl group having from 2 to 20 carbon atoms, a substituted alkoxy group having from 2 to 20 carbon atoms, a substituted aryl group having from 6 to 20 carbon atoms or a substituted aryloxy group having from 6 to 20 carbon, and the substituent has a polymerizable group at its terminal.

The above formula (IV) has an asymmetric carbon atom, and therefore includes a diastereomer and an enantiomer, and the invention encompasses all of them without distinction. In other words, the stereoisomers should not be distinguished depending on the method of describing their structure.

Examples of the discotic compound of formula (I) are mentioned below. With the numeral value (x) given on the side of each compound, the compound shown below is referred to as Compound (x).

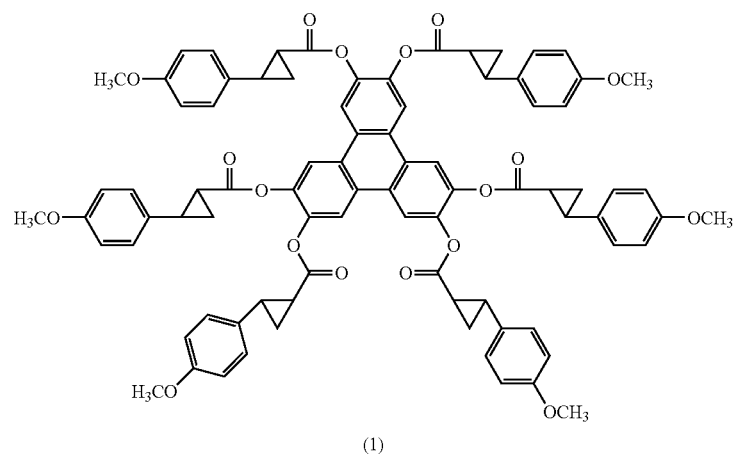

(1)

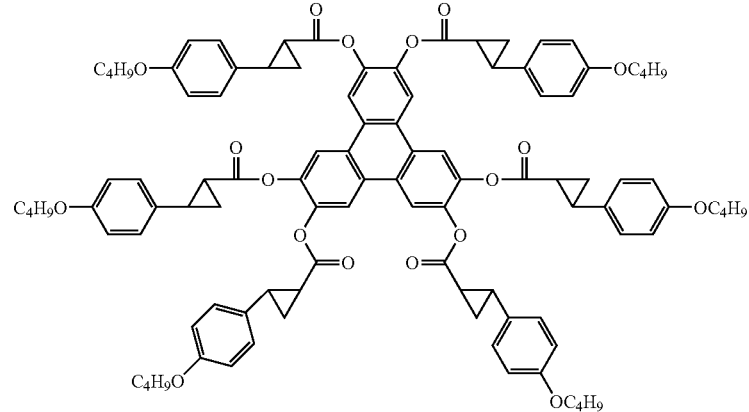

(2)

-continued
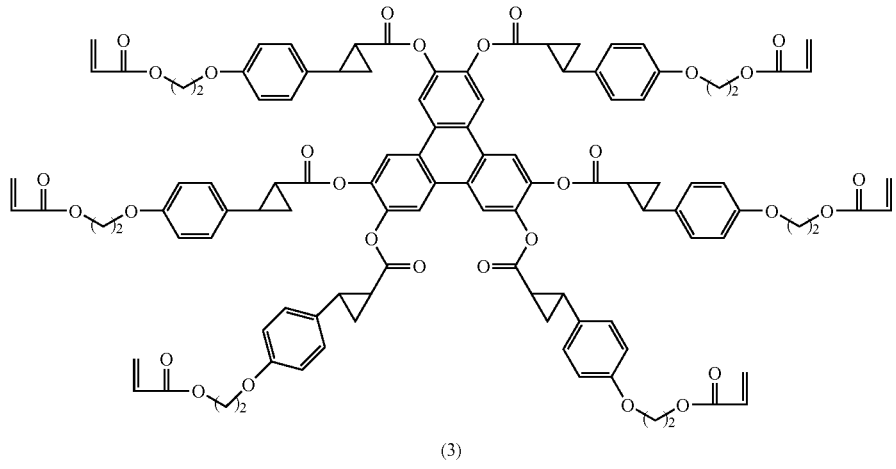
(3)
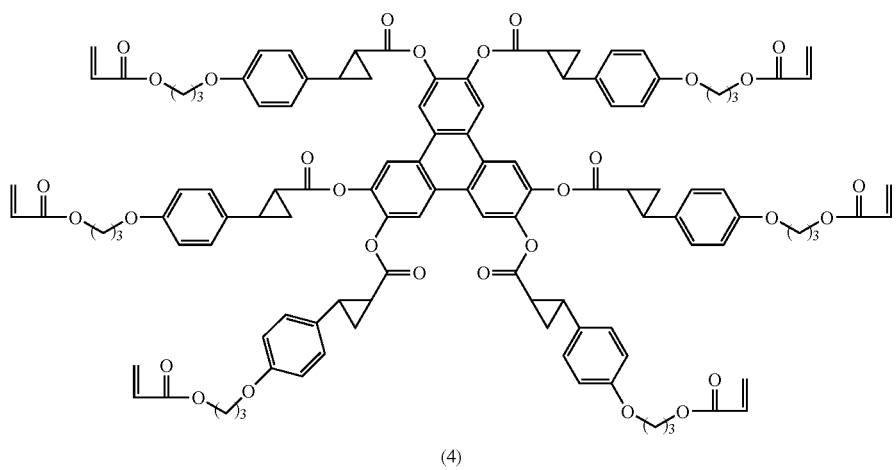
(4)
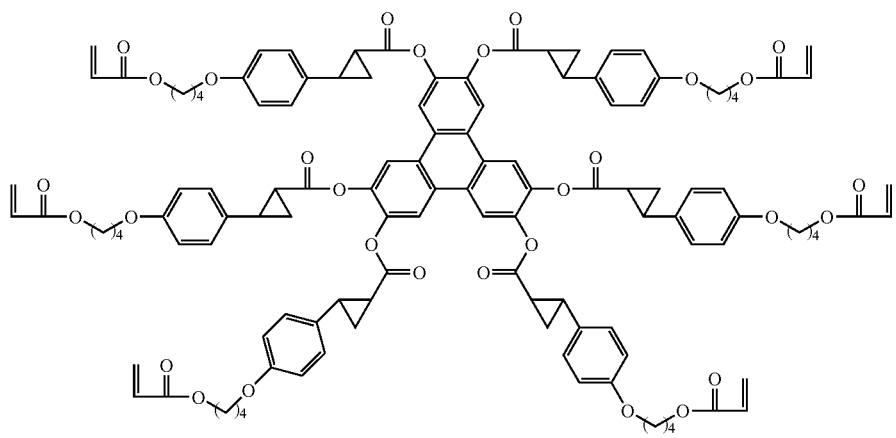
(5)

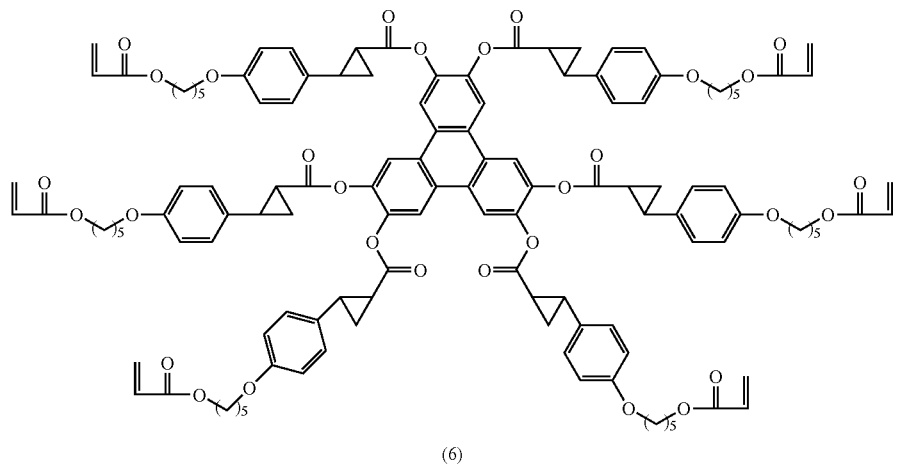
(6)
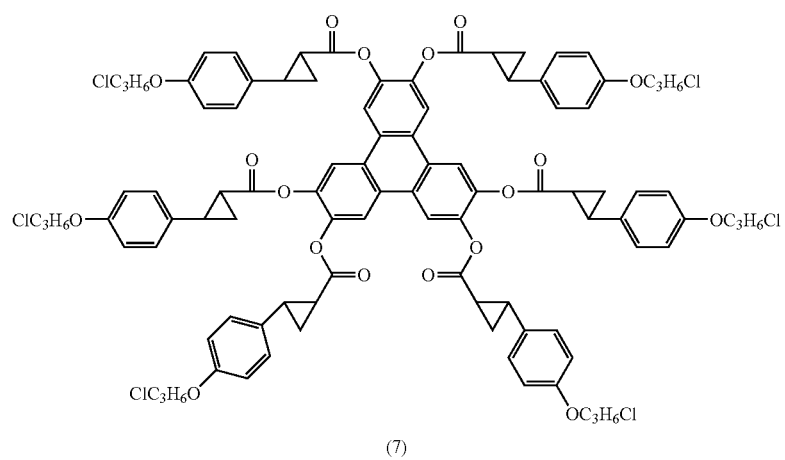
(7)
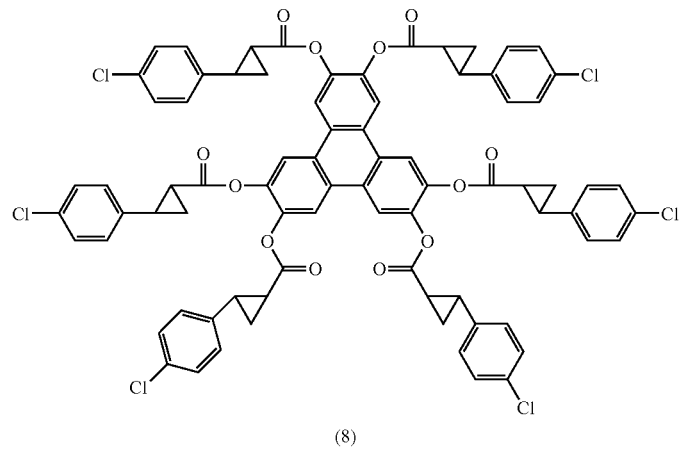
(8)

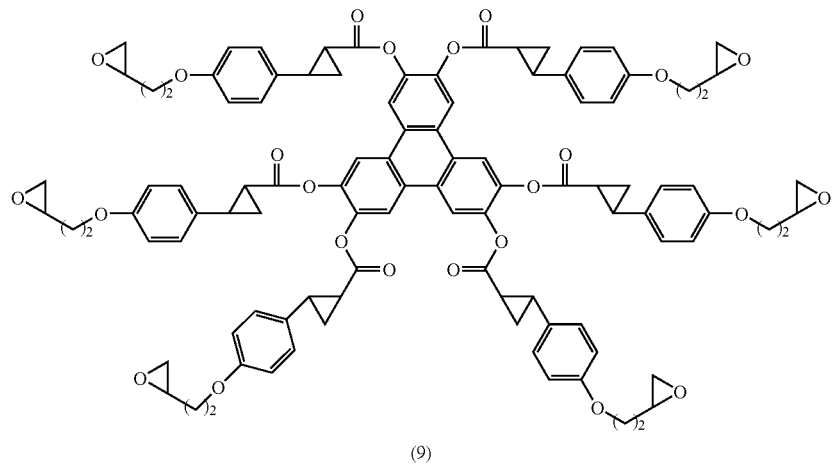
(9)
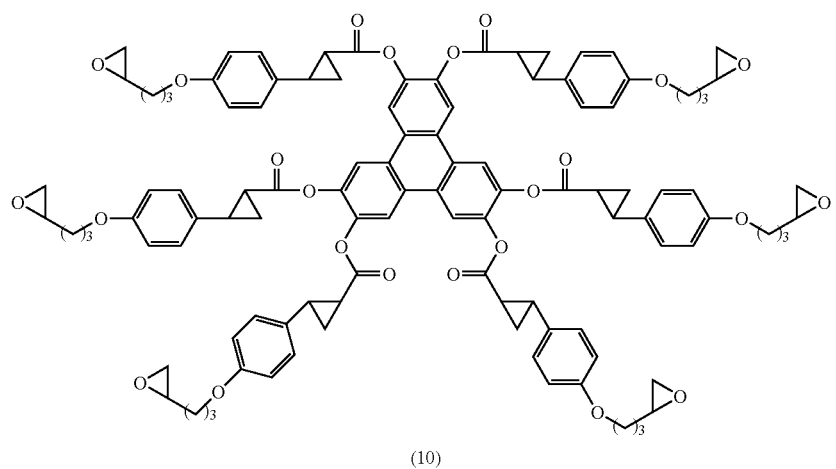
(10)
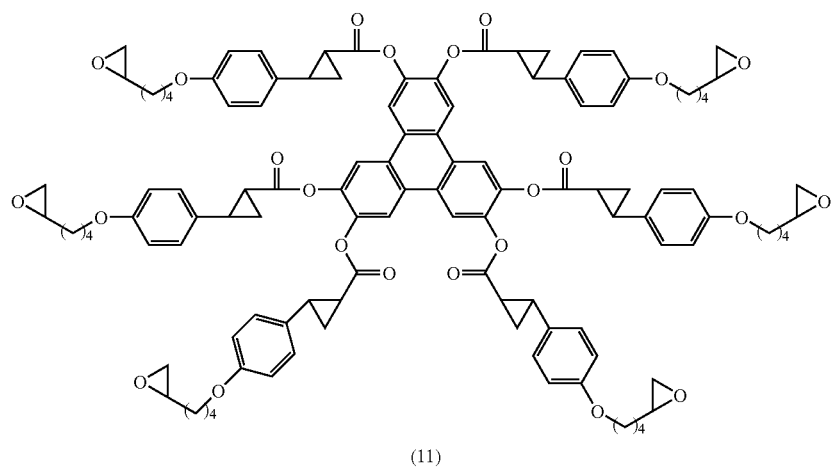
(11)

-continued
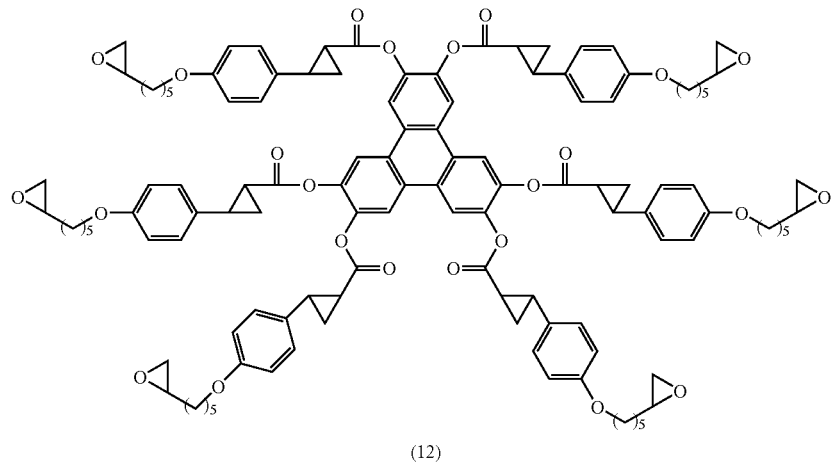
(12)
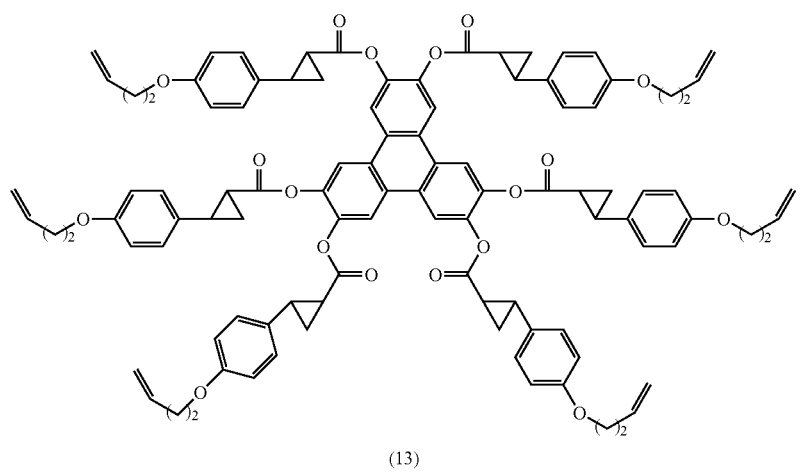
(13)
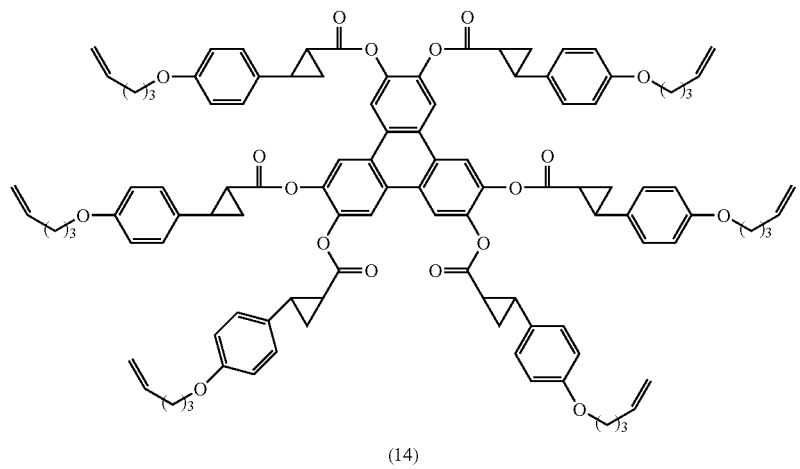
(14)

-continued
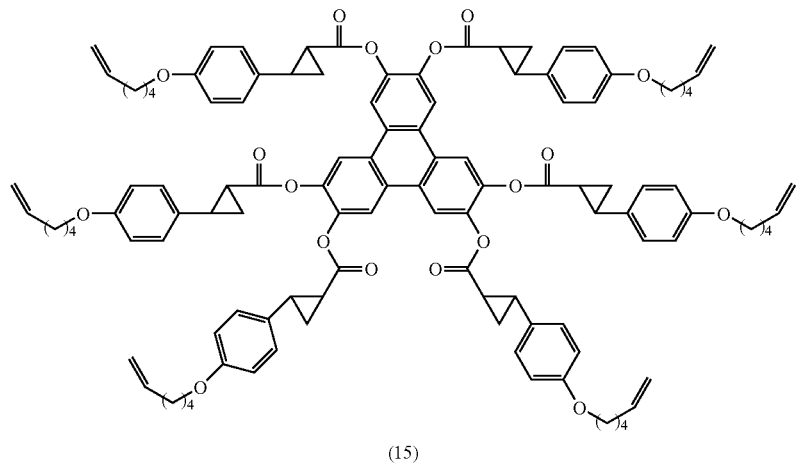
(15)
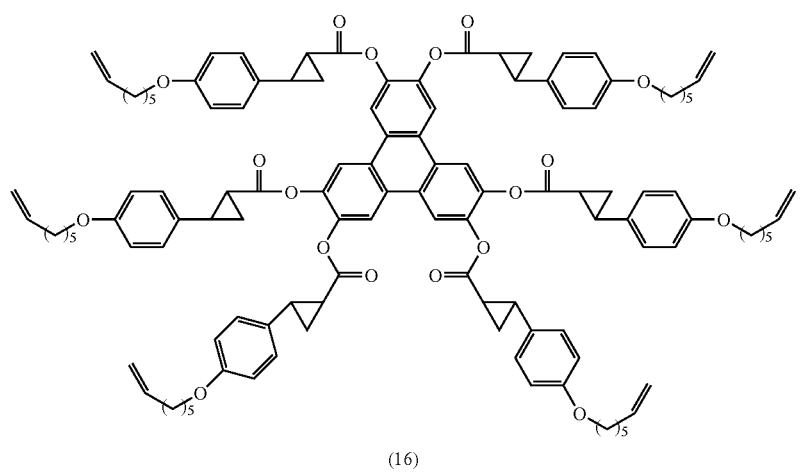
(16)
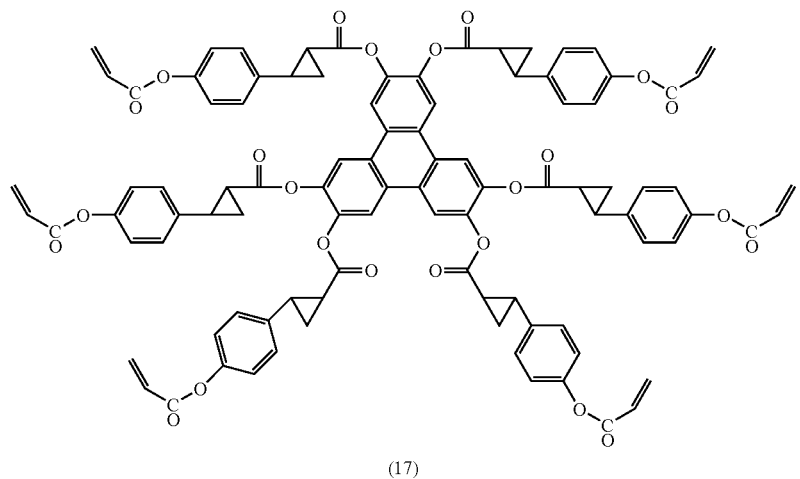
(17)

-continued
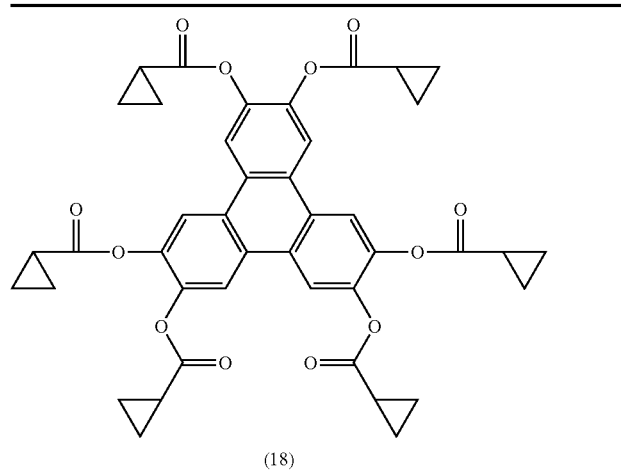
(18)
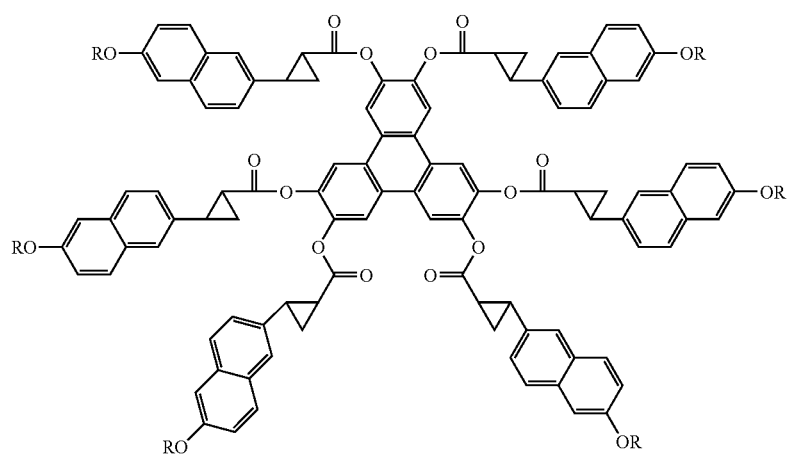
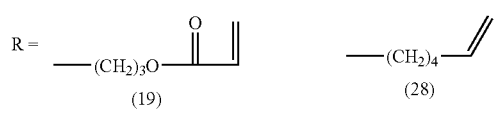
(19) (28)
(20) (29)
(21) (30)
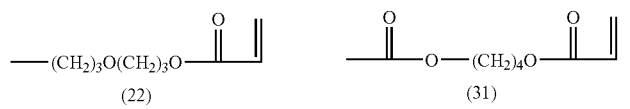
(22) (31)
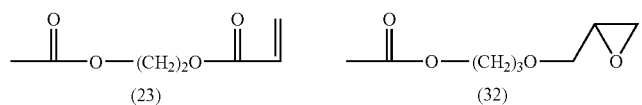
(23) (32)
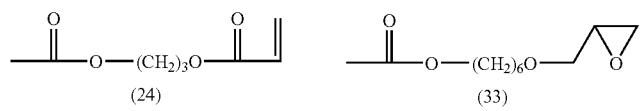
(24) (33)

-continued
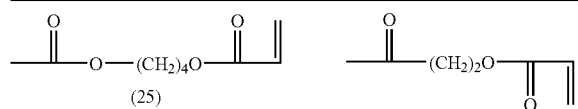
(25)
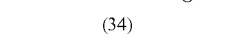
(34)
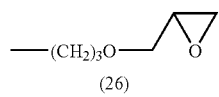
(26)
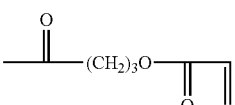
(35)
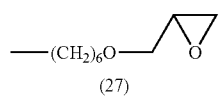
(27)
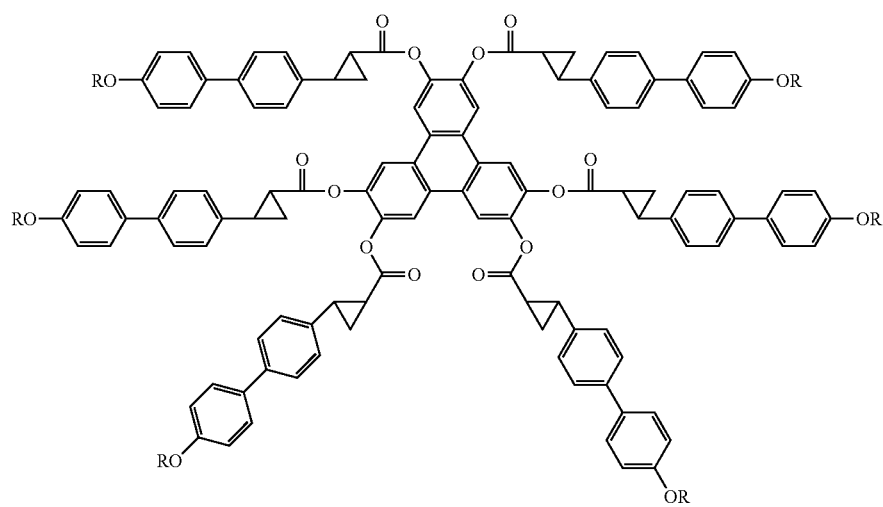
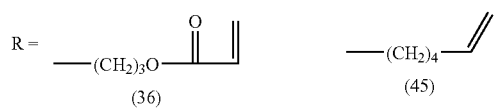
R = 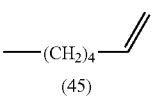
(36)    (45)
(37)    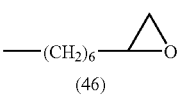 (46)
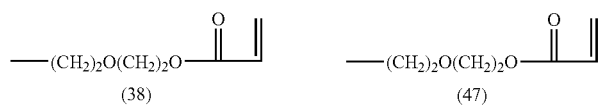
(38)    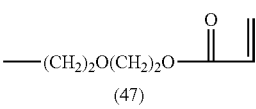 (47)
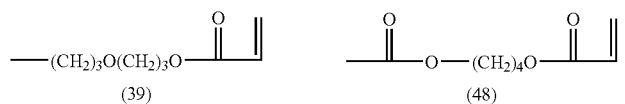
(39)    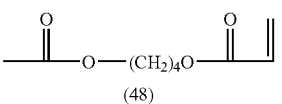 (48)
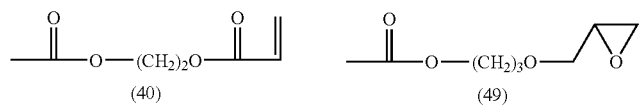
(40)    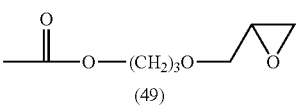 (49)
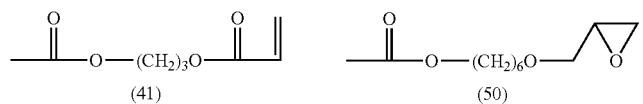
(41)    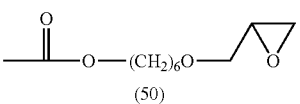 (50)

-continued
(42)
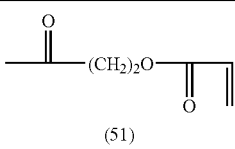
(51)
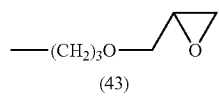
(43)
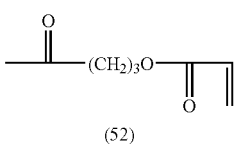
(52)
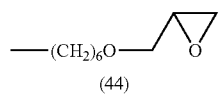
(44)
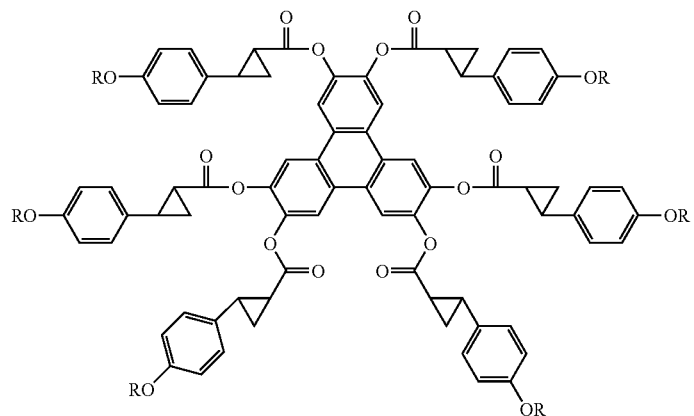
R = 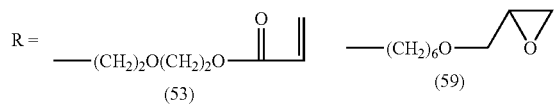
(53) (59)
(54) (60)
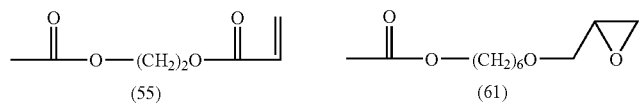
(55) (61)
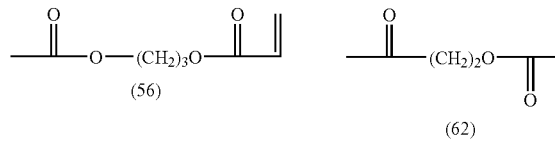
(56) (62)
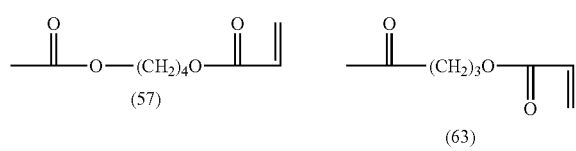
(57) (63)
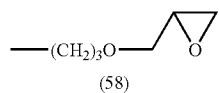
(58)

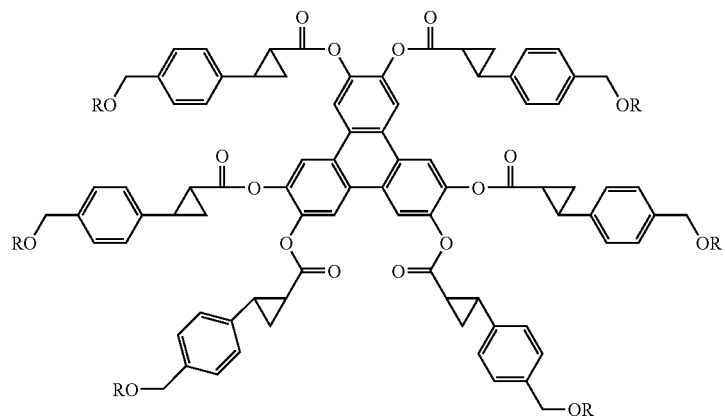
R = 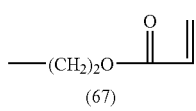 (64)   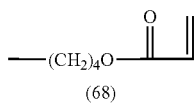 (67)
 (65)   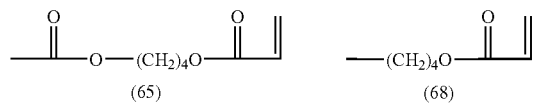 (68)
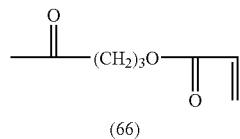 (66)
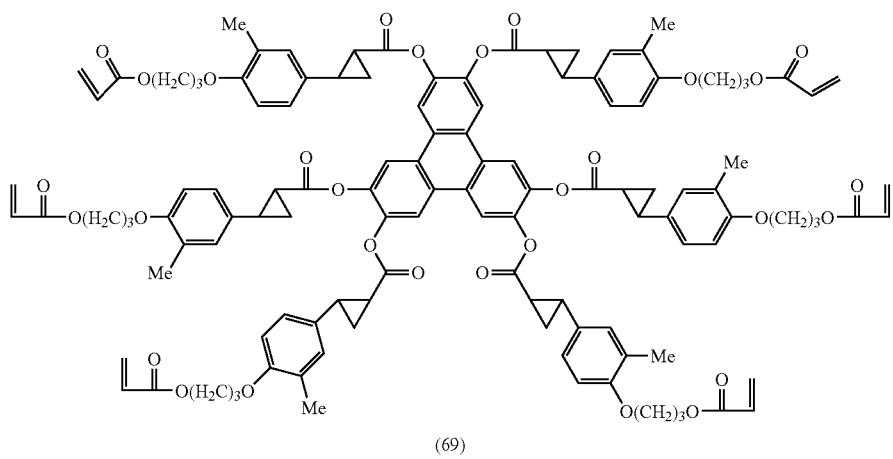
(69)

-continued
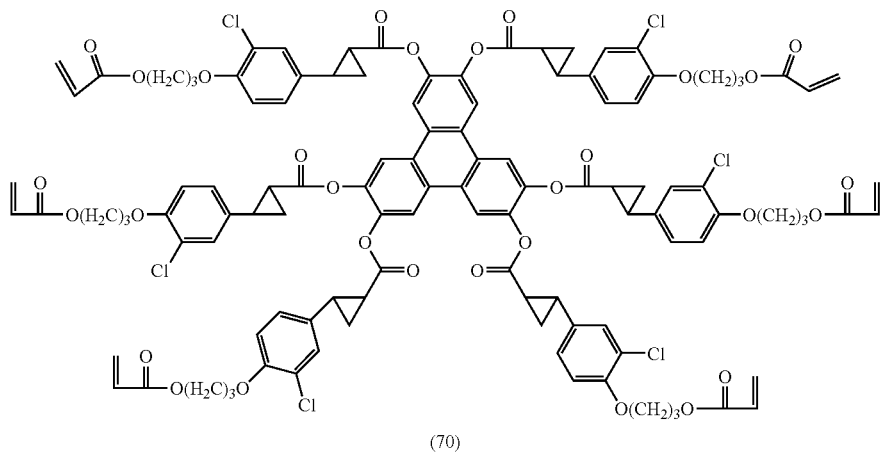
(70)
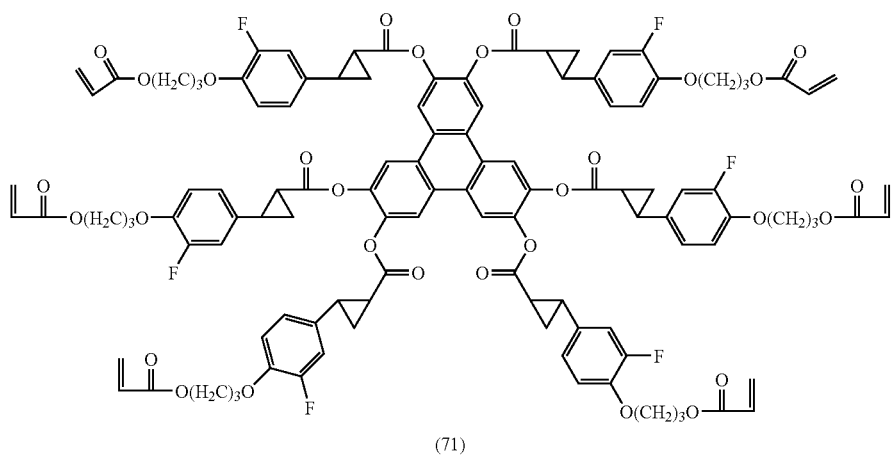
(71)
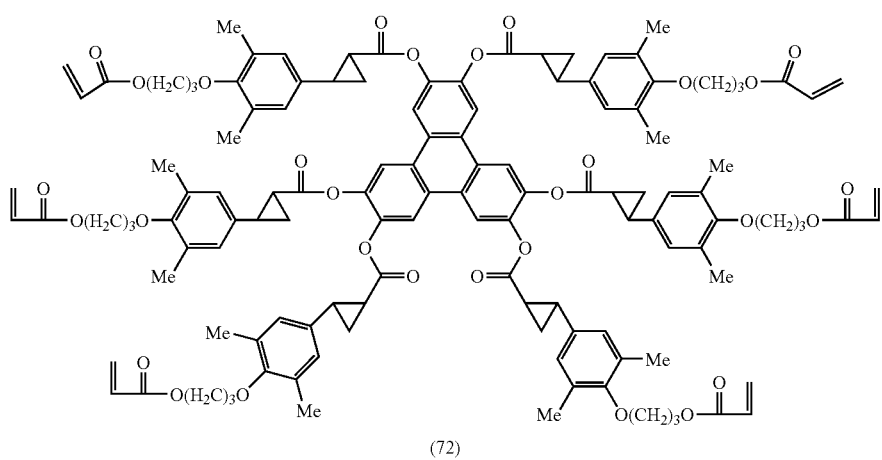
(72)

-continued
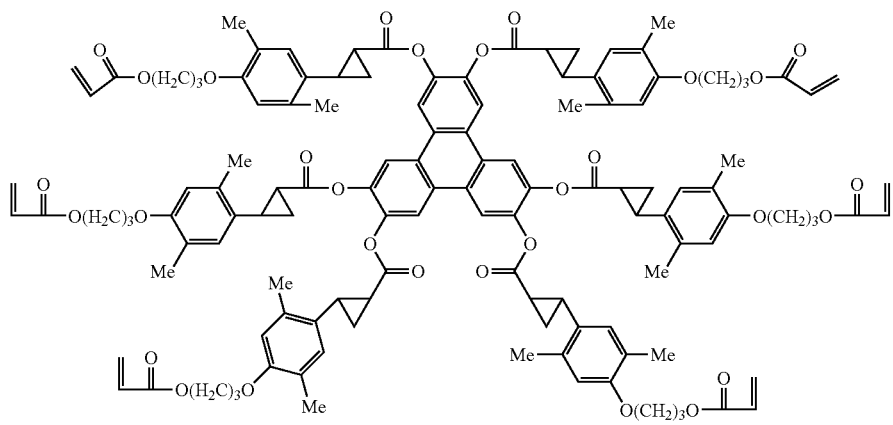
(73)
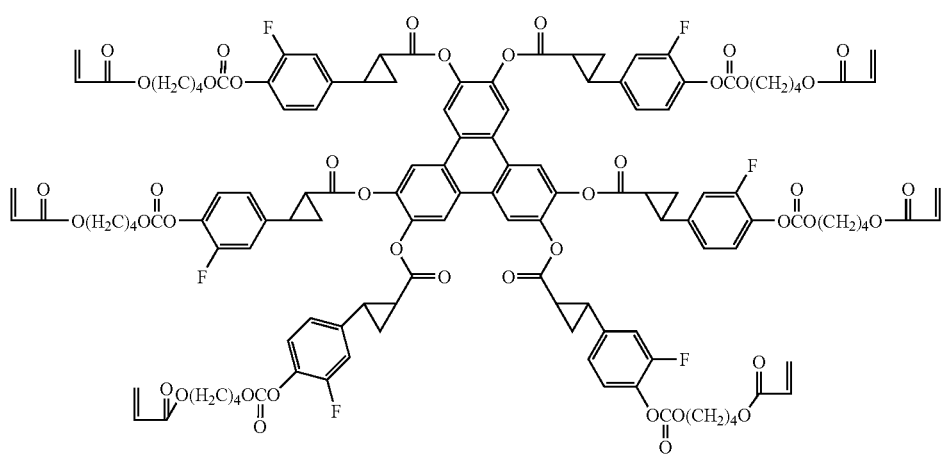
(74)
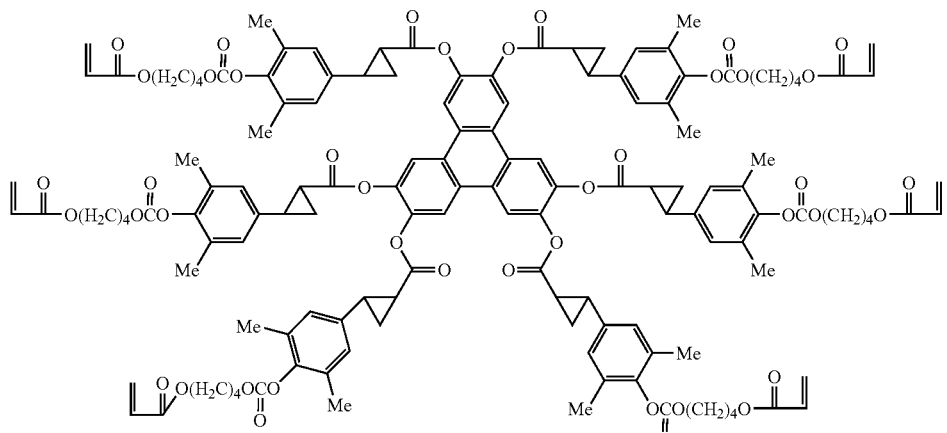
(75)

-continued

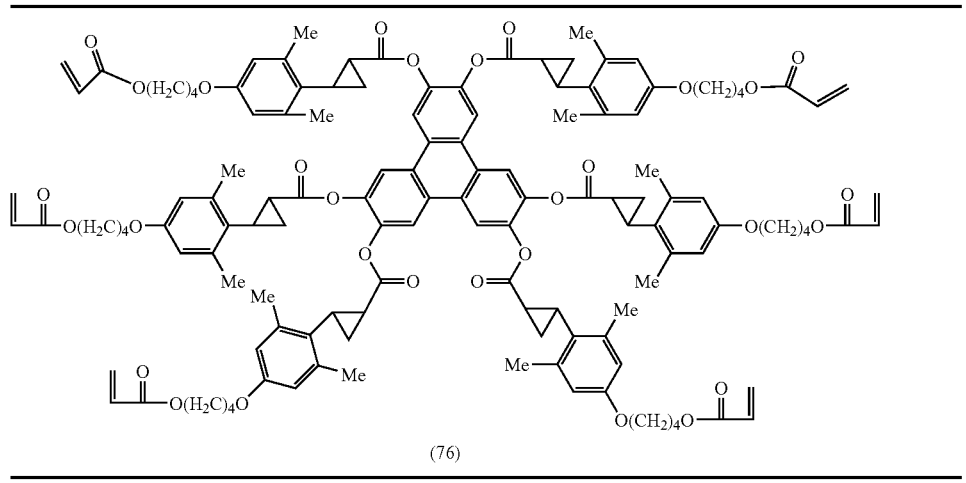

(76)

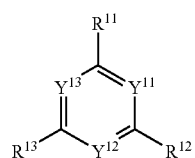

(DI)

In formula (DI), $Y^{11}$, $Y^{12}$ and $Y^{13}$ each independently represents a methine or a nitrogen atom.

In case where $Y^{11}$, $Y^{12}$ and $Y^{13}$ are methine, the hydrogen atom of methine may be substituted with a substituent. Preferred examples of the substituent, which methine may have, include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom and a cyano group. Of those substituents, more preferred include an alkyl group, an alkoxy group, an alkoxycarbonyl group, an acyloxy group, a halogen atom and a cyano group; and even more preferred include an alkyl group having from 1 to 12 carbon atoms, an alkoxy group having from 1 to 12 carbon atoms, an alkoxycarbonyl group having from 2 to 12 carbon atoms, an acyloxy group having from 2 to 12 carbon atoms, a halogen atom and a cyano group.

More preferably, $Y^{11}$, $Y^{12}$ and $Y^{13}$ are methine, more preferably non-substituted methine.

$R^{11}$, $R^{12}$ and $R^{13}$ each independently represents the following formula (DI-A), (DI-B) or (DI-C). In case where the wavelength dispersion is desired to be small, preferred is formula (DI-A) or (DI-C), and more preferred is formula (DI-A). More preferably, $R^{11}=R^{12}=R^{13}$.

In formula (DI-A), $A^{11}$, $A^{12}$, $A^{13}$, $A^{14}$, $A^{15}$ and $A^{16}$ each independently represents a methine or a nitrogen atom.

Preferably, at least one of $A^{11}$ and $A^{12}$ is a nitrogen atom, and more preferably, both of them are nitrogen atoms.

Preferably, at least three of $A^{13}$, $A^{14}$, $A^{15}$ and $A^{16}$ are methine, more preferably all of them are methine, and even more preferably, they are all non-substituted methine.

In case where $A^{11}$, $A^{12}$, $A^{13}$, $A^{14}$, $A^{15}$ and $A^{16}$ are methine, the methine may have a substituent. Examples of the substituent of the substituted methane include a halogen atom (a fluorine atom, a chlorine atom, a bromine atom, a iodine atom), cyano, nitro, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, and a halogen-substituted alkyl group having from 1 to 4 carbon atoms; even more preferred are a halogen atom, an alkyl group having from 1 to 3 carbon atoms, and a trifluoromethyl group.

$X^1$ represents an oxygen atom, a sulfur atom, a methylene or imino, preferably an oxygen atom.

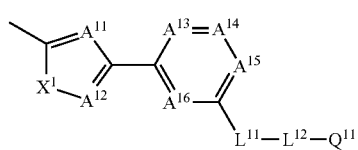

(DI-A)

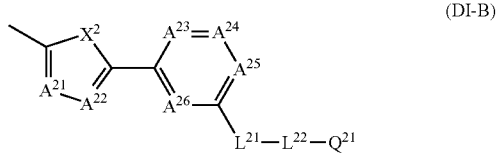

(DI-B)

In formula (DI-B), $A^{21}$, $A^{22}$, $A^{23}$, $A^{24}$, $A^{25}$ and $A^{26}$ each independently represents a methine or a nitrogen atom.

Preferably, at least one of $A^{21}$ and $A^{22}$ is a nitrogen atom, and more preferably, both of them are nitrogen atoms.

Preferably, at least three of $A^{23}$, $A^{24}$, $A^{25}$ and $A^{26}$ are methine, more preferably all of them are methine.

In case where $A^{21}$, $A^{22}$, $A^{23}$, $A^{24}$, $A^{25}$ and $A^{26}$ are methine, the methine may have a substituent. Examples of the substituent of substituted methine include a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, and a halogen-substituted alkyl group having from 1 to 4 carbon atoms; even more preferred are a halogen atom, an alkyl group having from 1 to 3 carbon atoms, and a trifluoromethyl group.

$X^2$ represents an oxygen atom, a sulfur atom, a methylene or imino, preferably an oxygen atom.

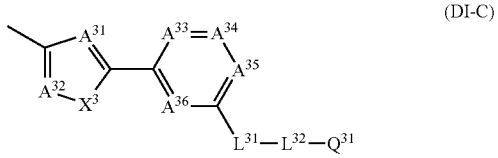

(DI-C)

In formula (DI-C), $A^{31}$, $A^{32}$, $A^{33}$, $A^{34}$, $A^{35}$ and $A^{36}$ each independently represents a methine or a nitrogen atom.

Preferably, at least one of $A^{31}$ and $A^{32}$ is a nitrogen atom, and more preferably, both of them are nitrogen atoms.

Preferably, at least three of $A^{33}$, $A^{34}$, $A^{35}$ and $A^{36}$ are methine, more preferably all of them are methine.

In case where $A^{31}$, $A^{32}$, $A^{33}$, $A^{34}$, $A^{35}$ and $A^{36}$ are methine, the methine may have a substituent. Examples of the substituent are a halogen atom (fluorine atom, chlorine atom, bromine atom, iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, and a halogen-substituted alkyl group having from 1 to 4 carbon atoms; even more preferred are a halogen atom, an alkyl group having from 1 to 3 carbon atoms, and a trifluoromethyl group.

$X^3$ represents an oxygen atom, a sulfur atom, a methylene or imino, preferably an oxygen atom.

$L^{11}$ in formula (DI-A), $L^{21}$ in formula (DI-B), and $L^{31}$ in formula (DI-C) each independently represents —O—, —O—CO—, —CO—O—, —O—CO—O—, —S—, —NH—, —SO₂—, —CH₂—, —CH=CH— or —C≡C—, preferably —O—, —O—CO—, —CO—O—, —O—CO—O—, —CH₂—, —CH=CH—, or —C≡C—, more preferably —O—, —O—CO—, —CO—O—, —O—CO—O—, or —CH₂—. In case where the above group is a group having a hydrogen atom, the hydrogen atom therein may be substituted with a substituent. Preferred examples of the substituent include a halogen atom, a cyano group, a nitro group, an alkyl group having from 1 to 6 carbon atoms, a halogen-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon atoms, and an acylamino group having from 2 to 6 carbon atoms; and more preferred are a halogen atom, and an alkyl group having from 1 to 6 carbon atoms.

$L^{12}$ in formula (DI-A), $L^{22}$ in formula (DI-B), and $L^{32}$ in formula (DI-C) each independently represent a divalent linking group selected from —O—, —S—, —C(=O)—, —SO₂—, —NH—, —CH₂—, —CH=CH— and —C≡C—, and their any combinations. The hydrogen atom in —NH—, —CH₂— and —CH=CH— may be substituted with a substituent. Preferred examples of the substituent include a halogen atom, a cyano group, a nitro group, an alkyl group having from 1 to 6 carbon atoms, a halogen-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon atoms, and an acylamino group having from 2 to 6 carbon atoms; and more preferred are a halogen atom, and an alkyl group having from 1 to 6 carbon atoms.

Preferably, $L^{12}$, $L^{22}$ and $L^{32}$ are independently selected from a group consisting of —O—, —C(=O)—, —CH₂—, —CH=CH— and —C≡C— and their any combinations.

Preferably, $L^{12}$, $L^{22}$ and $L^{32}$ independently have from 1 to 20 carbon atoms, more preferably from 2 to 14 carbon atoms. More preferably have from 1 to 16 (—CH₂—)'s, even more preferably from 2 to 12 (—CH₂—)'s.

Preferably, $L^{12}$, $L^{22}$ and $L^{32}$ are independently a divalent linking group selected from a group consisting of —O—, —S—, —C(=O)—, —SO₂—, —NH—, —CH₂—, —CH=CH— and —C≡C—, and their any combinations, and having from 1 to 20 carbon atoms. More preferably, the linking group has from 2 to 14 carbon atoms and has from 1 to 16 (—CH₂—)'s, even more preferably from 2 to 12 (—CH₂—)'s.

$Q^{11}$ in formula (DI-A), $Q^{21}$ in formula (DI-B) and $Q^{31}$ in formula (DI-C) each independently represent a polymerizable group or a hydrogen atom. In case where the compound in the invention is used in an optical film or the like, for example, in an optically-compensatory film of which the level of the retardation is desired not to change by heat, then $Q^{11}$, $Q^{21}$ and $Q^{31}$ are preferably a polymerizable group. The polymerization reaction of the group is preferably addition polymerization (including ring-cleavage polymerization) or polycondensation. Accordingly, the polymerizable group is preferably a functional group capable of undergoing addition polymerization or polycondensation. Examples of the polymerizable group are shown below.

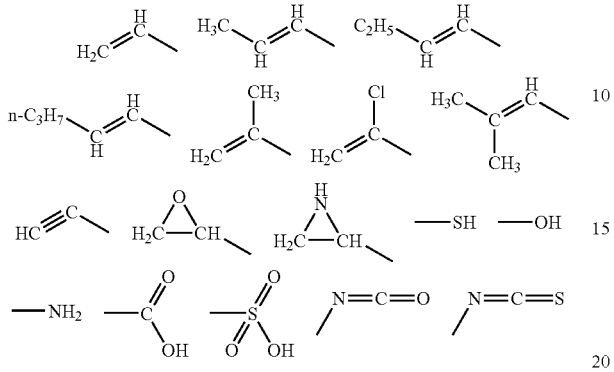

More preferably, the polymerizable group is a functional group capable of undergoing addition polymerization. The polymerizable group of the type is preferably a polymerizing ethylenic unsaturated group or a ring-cleaving polymerizable group.

Examples of the polymerizing ethylenic unsaturated group are the following formulae (M-1) to (M-6):

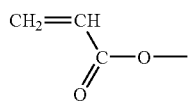 (M-1)

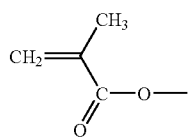 (M-2)

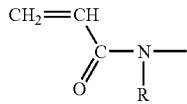 (M-3)

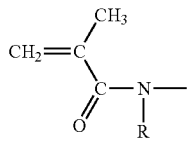 (M-4)

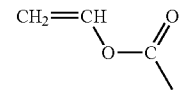 (M-5)

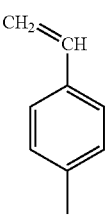 (M-6)

In formulae (M-3) and (M-4), R represents a hydrogen atom or an alkyl group, preferably a hydrogen atom or a methyl group.

Of formulae (M-1) to (M-6), preferred are (M-1) and (M-2), and more preferred is (M-1).

The ring-cleaving polymerizable group is preferably a cyclic ether group, more preferably an epoxy group or an oxetanyl group, most preferably an epoxy group.

Examples of the compound of formula (DI) are shown below, to which, however, the invention should not be limited.

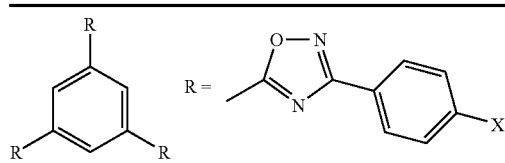

| | |
|---|---|
| X = —OC$_4$H$_9$ | D-1 |
| —OC$_5$H$_{11}$ | D-2 |
| —OC$_6$H$_{13}$ | D-3 |
| —OC$_7$H$_{15}$ | D-4 |
| —OC$_8$H$_{17}$ | D-5 |
| —OCH$_2$CH(CH$_3$)C$_4$H$_9$ | D-6 |
| —O(CH$_2$)$_2$OCOCH=CH$_2$ | D-7 |
| —O(CH$_2$)$_3$OCOCH=CH$_2$ | D-8 |
| —O(CH$_2$)$_4$OCOCH=CH$_2$ | D-9 |
| —O(CH$_2$)$_5$OCOCH=CH$_2$ | D-10 |
| —O(CH$_2$)$_6$OCOCH=CH$_2$ | D-11 |
| —O(CH$_2$)$_7$OCOCH=CH$_2$ | D-12 |
| —O(CH$_2$)$_8$OCOCH=CH$_2$ | D-13 |
| —O(CH$_2$)$_2$CH(CH$_3$)OCOCH=CH$_2$ | D-14 |
| —O(CH$_2$)$_3$CH(CH$_3$)OCOCH=CH$_2$ | D-15 |
| —O(CH$_2$CH$_2$O)$_2$COCH=CH$_2$ | D-16 |

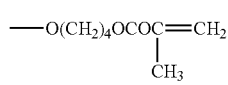 D-17

—O(CH$_2$)$_4$OCOCH=CHCH$_3$  D-18
—O(CH$_2$)$_4$OCH=CH$_2$  D-19

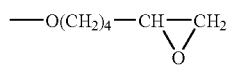 D-20

-continued

| | | | |
|---|---|---|---|
| (structure 1) | | X = —OCOC₄H₉ | D-21 |
| | | —OCOC₅H₁₁ | D-22 |
| | | —OCOC₆H₁₃ | D-23 |
| | | —OCO(CH₂)₂OCOCH=CH₂ | D-24 |
| | | —OCO(CH₂)₃OCOCH=CH₂ | D-25 |
| | | —OCO(CH₂)₄OCOCH=CH₂ | D-26 |
| | | —OCO(CH₂)₅OCOCH=CH₂ | D-27 |
| | | —OCO(CH₂)₆OCOCH=CH₂ | D-28 |
| | | —OCO(CH₂)₇OCOCH=CH₂ | D-29 |
| | | —OCO(CH₂)₂CH(CH₃)OCOCH=CH₂ | D-30 |
| | | —OCO(CH₂)₂OCOC(CH₃)=CH₂ | D-31 |
| | | —OCO(CH₂)₂OCOCH=CHCH₃ | D-32 |
| | | —OCO(CH₂)₄OCH=CH₂ | D-33 |
| | | —OCO(CH₂)₄—CH(—O—)CH₂ (epoxide) | D-34 |
| (structure 2) | | X = —OCOOC₄H₉ | D-35 |
| | | —OCOOC₅H₁₁ | D-36 |
| | | —OCOOC₆H₁₃ | D-37 |
| | | —OCOO(CH₂)₂OCOCH=CH₂ | D-38 |
| | | —OCOO(CH₂)₃OCOCH=CH₂ | D-39 |
| | | —OCOO(CH₂)₄OCOCH=CH₂ | D-40 |
| | | —OCOO(CH₂)₅OCOCH=CH₂ | D-41 |
| | | —OCOO(CH₂)₆OCOCH=CH₂ | D-42 |
| | | —OCOO(CH₂)₇OCOCH=CH₂ | D-43 |
| | | —OCOOCH(CH₃)CH₂CH₂OCOCH=CH₂ | D-44 |
| | | —OCOOC(CH₂CH₂O)₂COCH=CH₂ | D-45 |
| | | —OCOO(CH₂)₂OCOC(CH₃)=CH₂ | D-46 |
| | | —OCOO(CH₂)₂OCOCH=CHCH₃ | D-47 |
| | | —OCOO(CH₂)₄OCH=CH₂ | D-48 |
| | | —OCOO(CH₂)₄—CH(—O—)CH₂ (epoxide) | D-49 |
| (structure 3) | | X = —OC₄H₉ | D-50 |
| | | —OC₅H₁₁ | D-51 |
| | | —OC₆H₁₃ | D-52 |
| | | —OC₇H₁₅ | D-53 |
| | | —OC₈H₁₇ | D-54 |
| | | —OCH₂CH(CH₃)C₄H₉ | D-55 |
| | | —O(CH₂)₂OCOCH=CH₂ | D-56 |
| | | —O(CH₂)₃OCOCH=CH₂ | D-57 |
| | | —O(CH₂)₄OCOCH=CH₂ | D-58 |
| | | —O(CH₂)₅OCOCH=CH₂ | D-59 |
| | | —O(CH₂)₆OCOCH=CH₂ | D-60 |
| | | —O(CH₂)₇OCOCH=CH₂ | D-61 |
| | | —O(CH₂)₈OCOCH=CH₂ | D-62 |
| | | —O(CH₂)₂CH(CH₃)OCOCH=CH₂ | D-63 |
| | | —O(CH₂)₃CH(CH₃)OCOCH=CH₂ | D-64 |
| | | —O(CH₂CH₂O)₂COCH=CH₂ | D-65 |
| | | —O(CH₂)₄OCOC(CH₃)=CH₂ | D-66 |
| | | —O(CH₂)₄OCOCH=CHCH₃ | D-67 |
| | | —O(CH₂)₄OCH=CH₂ | D-68 |
| | | —O(CH₂)₄—CH(—O—)CH₂ (epoxide) | D-69 |

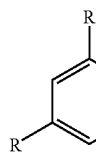
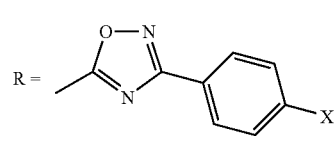
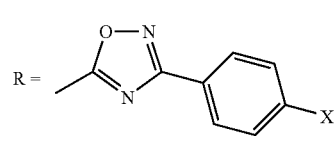

-continued

| | | | |
|---|---|---|---|
| 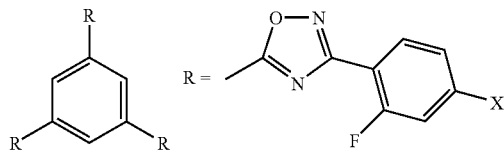 | 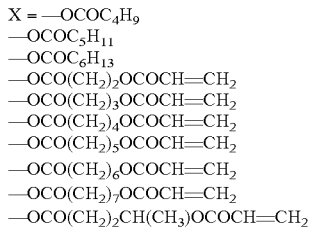 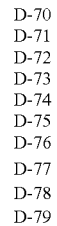 | X = —OCOC$_4$H$_9$<br>—OCOC$_5$H$_{11}$<br>—OCOC$_6$H$_{13}$<br>—OCO(CH$_2$)$_2$OCOCH=CH$_2$<br>—OCO(CH$_2$)$_3$OCOCH=CH$_2$<br>—OCO(CH$_2$)$_4$OCOCH=CH$_2$<br>—OCO(CH$_2$)$_5$OCOCH=CH$_2$<br>—OCO(CH$_2$)$_6$OCOCH=CH$_2$<br>—OCO(CH$_2$)$_7$OCOCH=CH$_2$<br>—OCO(CH$_2$)$_2$CH(CH$_3$)OCOCH=CH$_2$ | D-70<br>D-71<br>D-72<br>D-73<br>D-74<br>D-75<br>D-76<br>D-77<br>D-78<br>D-79 |
| | | —OCO(CH$_2$)$_2$OCOC(CH$_3$)=CH$_2$ | D-80 |
| | | —OCO(CH$_2$)$_2$OCOCH=CHCH$_3$<br>—OCO(CH$_2$)$_4$OCH=CH$_2$ | D-81<br>D-82 |
| | | —OCO(CH$_2$)$_4$—CH(—O—)CH$_2$ | D-83 |
| 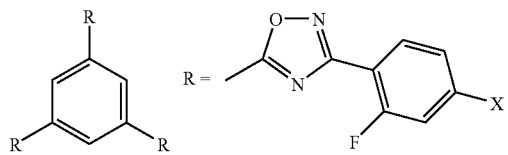 | 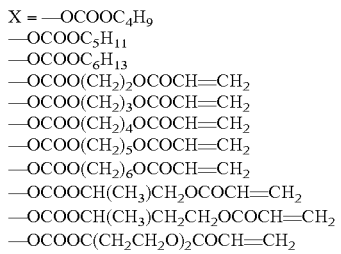 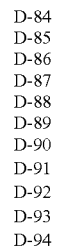 | X = —OCOOC$_4$H$_9$<br>—OCOOC$_5$H$_{11}$<br>—OCOOC$_6$H$_{13}$<br>—OCOO(CH$_2$)$_2$OCOCH=CH$_2$<br>—OCOO(CH$_2$)$_3$OCOCH=CH$_2$<br>—OCOO(CH$_2$)$_4$OCOCH=CH$_2$<br>—OCOO(CH$_2$)$_5$OCOCH=CH$_2$<br>—OCOO(CH$_2$)$_6$OCOCH=CH$_2$<br>—OCOOCH(CH$_3$)CH$_2$OCOCH=CH$_2$<br>—OCOOCH(CH$_3$)CH$_2$CH$_2$OCOCH=CH$_2$<br>—OCOOC(CH$_2$CH$_2$O)$_2$COCH=CH$_2$ | D-84<br>D-85<br>D-86<br>D-87<br>D-88<br>D-89<br>D-90<br>D-91<br>D-92<br>D-93<br>D-94 |
| | | —OCOO(CH$_2$)$_2$OCOC(CH$_3$)=CH$_2$ | D-95 |
| | | —OCOO(CH$_2$)$_2$OCOCH=CHCH$_3$<br>—OCOO(CH$_2$)$_4$OCH=CH$_2$ | D-96<br>D-97 |
| | | —OCOO(CH$_2$)$_4$—CH(—O—)CH$_2$ | D-98 |
| 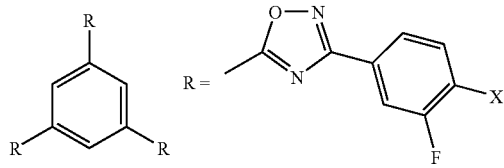 | 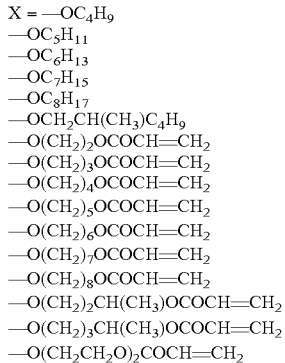 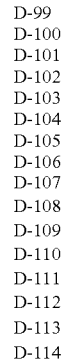 | X = —OC$_4$H$_9$<br>—OC$_5$H$_{11}$<br>—OC$_6$H$_{13}$<br>—OC$_7$H$_{15}$<br>—OC$_8$H$_{17}$<br>—OCH$_2$CH(CH$_3$)C$_4$H$_9$<br>—O(CH$_2$)$_2$OCOCH=CH$_2$<br>—O(CH$_2$)$_3$OCOCH=CH$_2$<br>—O(CH$_2$)$_4$OCOCH=CH$_2$<br>—O(CH$_2$)$_5$OCOCH=CH$_2$<br>—O(CH$_2$)$_6$OCOCH=CH$_2$<br>—O(CH$_2$)$_7$OCOCH=CH$_2$<br>—O(CH$_2$)$_8$OCOCH=CH$_2$<br>—O(CH$_2$)$_2$CH(CH$_3$)OCOCH=CH$_2$<br>—O(CH$_2$)$_3$CH(CH$_3$)OCOCH=CH$_2$<br>—O(CH$_2$CH$_2$O)$_2$COCH=CH$_2$ | D-99<br>D-100<br>D-101<br>D-102<br>D-103<br>D-104<br>D-105<br>D-106<br>D-107<br>D-108<br>D-109<br>D-110<br>D-111<br>D-112<br>D-113<br>D-114 |
| | 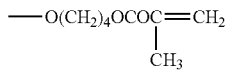  | —O(CH$_2$)$_4$OCOC(CH$_3$)=CH$_2$ | D-115 |
| | | —O(CH$_2$)$_4$OCOCH=CHCH$_3$<br>—O(CH$_2$)$_4$OCH=CH$_2$ | D-116<br>D-117 |
| | 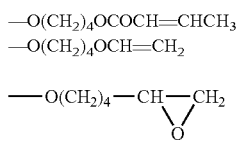 | —O(CH$_2$)$_4$—CH(—O—)CH$_2$ | D-118 |

-continued

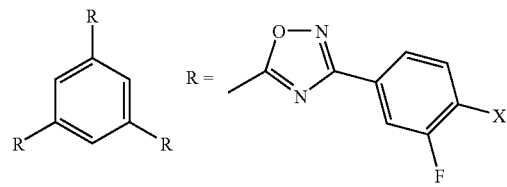 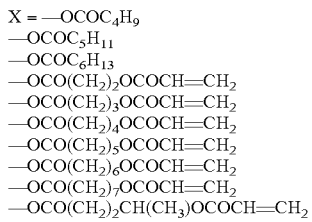 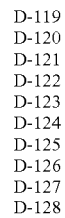

| | |
|---|---|
| X = —OCOC$_4$H$_9$ | D-119 |
| —OCOC$_5$H$_{11}$ | D-120 |
| —OCOC$_6$H$_{13}$ | D-121 |
| —OCO(CH$_2$)$_2$OCOCH=CH$_2$ | D-122 |
| —OCO(CH$_2$)$_3$OCOCH=CH$_2$ | D-123 |
| —OCO(CH$_2$)$_4$OCOCH=CH$_2$ | D-124 |
| —OCO(CH$_2$)$_5$OCOCH=CH$_2$ | D-125 |
| —OCO(CH$_2$)$_6$OCOCH=CH$_2$ | D-126 |
| —OCO(CH$_2$)$_7$OCOCH=CH$_2$ | D-127 |
| —OCO(CH$_2$)$_2$CH(CH$_3$)OCOCH=CH$_2$ | D-128 |
| —OCO(CH$_2$)$_2$OCOC(CH$_3$)=CH$_2$ | D-129 |
| —OCO(CH$_2$)$_2$OCOCH=CHCH$_3$ | D-130 |
| —OCO(CH$_2$)$_4$OCH=CH$_2$ | D-131 |
| —OCO(CH$_2$)$_4$—CH(—O—)CH$_2$ (epoxide) | D-132 |

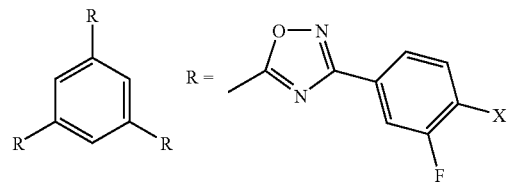 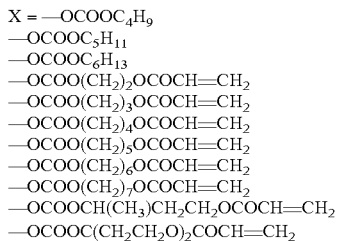 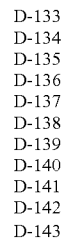

| | |
|---|---|
| X = —OCOOC$_4$H$_9$ | D-133 |
| —OCOOC$_5$H$_{11}$ | D-134 |
| —OCOOC$_6$H$_{13}$ | D-135 |
| —OCOO(CH$_2$)$_2$OCOCH=CH$_2$ | D-136 |
| —OCOO(CH$_2$)$_3$OCOCH=CH$_2$ | D-137 |
| —OCOO(CH$_2$)$_4$OCOCH=CH$_2$ | D-138 |
| —OCOO(CH$_2$)$_5$OCOCH=CH$_2$ | D-139 |
| —OCOO(CH$_2$)$_6$OCOCH=CH$_2$ | D-140 |
| —OCOO(CH$_2$)$_7$OCOCH=CH$_2$ | D-141 |
| —OCOOCH(CH$_3$)CH$_2$CH$_2$OCOCH=CH$_2$ | D-142 |
| —OCOOC(CH$_2$CH$_2$O)$_2$COCH=CH$_2$ | D-143 |
| —OCOO(CH$_2$)$_2$OCOC(CH$_3$)=CH$_2$ | D-144 |
| —OCOO(CH$_2$)$_2$OCOCH=CHCH$_3$ | D-145 |
| —OCOO(CH$_2$)$_4$OCH=CH$_2$ | D-146 |
| —OCOO(CH$_2$)$_4$—CH(—O—)CH$_2$ (epoxide) | D-147 |

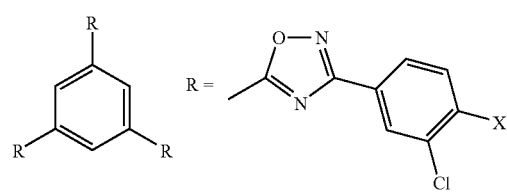 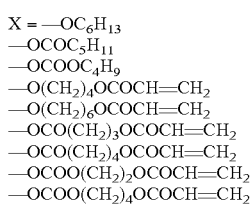 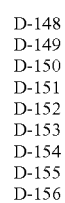

| | |
|---|---|
| X = —OC$_6$H$_{13}$ | D-148 |
| —OCOC$_5$H$_{11}$ | D-149 |
| —OCOOC$_4$H$_9$ | D-150 |
| —O(CH$_2$)$_4$OCOCH=CH$_2$ | D-151 |
| —O(CH$_2$)$_6$OCOCH=CH$_2$ | D-152 |
| —OCO(CH$_2$)$_3$OCOCH=CH$_2$ | D-153 |
| —OCO(CH$_2$)$_4$OCOCH=CH$_2$ | D-154 |
| —OCOO(CH$_2$)$_2$OCOCH=CH$_2$ | D-155 |
| —OCOO(CH$_2$)$_4$OCOCH=CH$_2$ | D-156 |

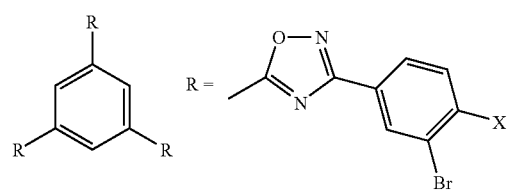 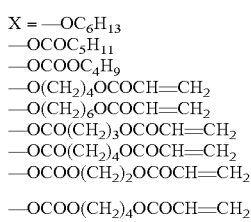 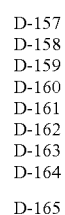

| | |
|---|---|
| X = —OC$_6$H$_{13}$ | D-157 |
| —OCOC$_5$H$_{11}$ | D-158 |
| —OCOOC$_4$H$_9$ | D-159 |
| —O(CH$_2$)$_4$OCOCH=CH$_2$ | D-160 |
| —O(CH$_2$)$_6$OCOCH=CH$_2$ | D-161 |
| —OCO(CH$_2$)$_3$OCOCH=CH$_2$ | D-162 |
| —OCO(CH$_2$)$_4$OCOCH=CH$_2$ | D-163 |
| —OCOO(CH$_2$)$_2$OCOCH=CH$_2$ | D-164 |
| —OCOO(CH$_2$)$_4$OCOCH=CH$_2$ | D-165 |

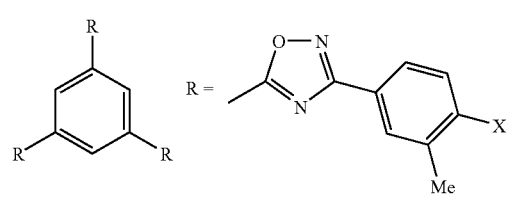 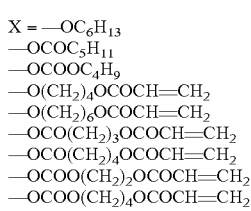 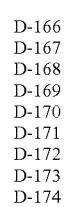

| | |
|---|---|
| X = —OC$_6$H$_{13}$ | D-166 |
| —OCOC$_5$H$_{11}$ | D-167 |
| —OCOOC$_4$H$_9$ | D-168 |
| —O(CH$_2$)$_4$OCOCH=CH$_2$ | D-169 |
| —O(CH$_2$)$_6$OCOCH=CH$_2$ | D-170 |
| —OCO(CH$_2$)$_3$OCOCH=CH$_2$ | D-171 |
| —OCO(CH$_2$)$_4$OCOCH=CH$_2$ | D-172 |
| —OCOO(CH$_2$)$_2$OCOCH=CH$_2$ | D-173 |
| —OCOO(CH$_2$)$_4$OCOCH=CH$_2$ | D-174 |

-continued

| R group | R = structure | X values | Code |
|---|---|---|---|
| 1,3,5-tri-R benzene | 5-methyl-1,2,4-oxadiazol-3-yl linked to phenyl with CF₃ and X | X = —OC₆H₁₃ | D-175 |
| | | —OCOC₅H₁₁ | D-176 |
| | | —OCOOC₄H₉ | D-178 |
| | | —O(CH₂)₄OCOCH═CH₂ | D-179 |
| | | —O(CH₂)₆OCOCH═CH₂ | D-180 |
| | | —OCO(CH₂)₃OCOCH═CH₂ | D-181 |
| | | —OCO(CH₂)₄OCOCH═CH₂ | D-182 |
| | | —OCOO(CH₂)₂OCOCH═CH₂ | D-183 |
| | | —OCOO(CH₂)₄OCOCH═CH₂ | D-184 |
| 1,3,5-tri-R benzene | 5-methyl-1,2,4-oxadiazol-3-yl linked to phenyl with Cl and X | X = —OC₆H₁₃ | D-185 |
| | | —OCOC₅H₁₁ | D-186 |
| | | —OCOOC₄H₉ | D-187 |
| | | —O(CH₂)₄OCOCH═CH₂ | D-188 |
| | | —O(CH₂)₆OCOCH═CH₂ | D-189 |
| | | —OCO(CH₂)₃OCOCH═CH₂ | D-190 |
| | | —OCO(CH₂)₄OCOCH═CH₂ | D-191 |
| | | —OCOO(CH₂)₂OCOCH═CH₂ | D-192 |
| | | —OCOO(CH₂)₄OCOCH═CH₂ | D-193 |
| 1,3,5-tri-R benzene | 5-methyl-1,2,4-oxadiazol-3-yl linked to phenyl with 2,3-di-F and X | X = —OC₆H₁₃ | D-194 |
| | | —OCOC₅H₁₁ | D-195 |
| | | —OCOOC₄H₉ | D-196 |
| | | —O(CH₂)₄OCOCH═CH₂ | D-197 |
| | | —O(CH₂)₆OCOCH═CH₂ | D-198 |
| | | —OCO(CH₂)₃OCOCH═CH₂ | D-199 |
| | | —OCO(CH₂)₄OCOCH═CH₂ | D-200 |
| | | —OCOO(CH₂)₂OCOCH═CH₂ | D-201 |
| | | —OCOO(CH₂)₄OCOCH═CH₂ | D-202 |
| 1,3,5-tri-R benzene | 3-methyl-1,2,4-oxadiazol-5-yl linked to phenyl-X | X = —OC₆H₁₃ | D-203 |
| | | —OCOC₅H₁₁ | D-204 |
| | | —OCOOC₄H₉ | D-205 |
| | | —O(CH₂)₄OCOCH═CH₂ | D-206 |
| | | —O(CH₂)₆OCOCH═CH₂ | D-207 |
| | | —OCO(CH₂)₃OCOCH═CH₂ | D-208 |
| | | —OCO(CH₂)₄OCOCH═CH₂ | D-209 |
| | | —OCOO(CH₂)₂OCOCH═CH₂ | D-210 |
| | | —OCOO(CH₂)₄OCOCH═CH₂ | D-211 |
| 1,3,5-tri-R benzene | 3-methyl-1,2,4-oxadiazol-5-yl linked to phenyl with F and X | X = —OC₆H₁₃ | D-212 |
| | | —OCOC₅H₁₁ | D-213 |
| | | —OCOOC₄H₉ | D-214 |
| | | —O(CH₂)₄OCOCH═CH₂ | D-215 |
| | | —O(CH₂)₆OCOCH═CH₂ | D-216 |
| | | —OCO(CH₂)₃OCOCH═CH₂ | D-217 |
| | | —OCO(CH₂)₄OCOCH═CH₂ | D-218 |
| | | —OCOO(CH₂)₂OCOCH═CH₂ | D-219 |
| | | —OCOO(CH₂)₄OCOCH═CH₂ | D-220 |
| 1,3,5-tri-R benzene | 5-methyl-1,2,4-thiadiazol-3-yl linked to phenyl-X | X = —OC₆H₁₃ | D-221 |
| | | —OCOC₅H₁₁ | D-222 |
| | | —OCOOC₄H₉ | D-223 |
| | | —O(CH₂)₆OCOCH═CH₂ | D-224 |
| | | —OCO(CH₂)₃OCOCH═CH₂ | D-225 |
| | | —OCOO(CH₂)₄OCOCH═CH₂ | D-226 |
| 1,3,5-tri-R benzene | 5-methyl-isoxazol-3-yl linked to phenyl-X | X = —OC₆H₁₃ | D-227 |
| | | —OCOC₅H₁₁ | D-228 |
| | | —OCOOC₄H₉ | D-229 |
| | | —O(CH₂)₆OCOCH═CH₂ | D-230 |
| | | —OCO(CH₂)₃OCOCH═CH₂ | D-231 |
| | | —OCOO(CH₂)₄OCOCH═CH₂ | D-232 |
| 1,3,5-tri-R benzene | 2-methyl-oxazol-4-yl linked to phenyl-X | X = —OC₆H₁₃ | D-233 |
| | | —OCOC₅H₁₁ | D-234 |
| | | —OCOOC₄H₉ | D-235 |
| | | —O(CH₂)₆OCOCH═CH₂ | D-236 |
| | | —OCO(CH₂)₃OCOCH═CH₂ | D-237 |
| | | —OCOO(CH₂)₄OCOCH═CH₂ | D-238 |

-continued

| R (triphenyl core with R substituents) | R = (heterocycle-phenyl) | —O(CH$_2$)$_6$OCOCH=CH$_2$ | D-239 |
| --- | --- | --- | --- |
| 1,3,5-R-substituted benzene | R = 5-methylisoxazol-4-yl-phenyl-X | —O(CH$_2$)$_6$OCOCH=CH$_2$ | D-239 |
| 1,3,5-R-substituted benzene | R = 5-methylisothiazol-3-yl-phenyl-X | —O(CH$_2$)$_6$OCOCH=CH$_2$ | D-240 |
| 1,3,5-R-substituted benzene | R = 2-methylthiazol-4-yl-phenyl-X | —O(CH$_2$)$_6$OCOCH=CH$_2$ | D-241 |
| 1,3,5-R-substituted benzene | R = 4-methylfuran-2-yl-phenyl-X | —O(CH$_2$)$_6$OCOCH=CH$_2$ | D-242 |
| 1,3,5-R-substituted benzene | R = 4-methyloxazol-2-yl-phenyl-X | —O(CH$_2$)$_6$OCOCH=CH$_2$ | D-243 |
| 1,3,5-R-substituted benzene | R = 3-methylisoxazol-5-yl-phenyl-X | —O(CH$_2$)$_6$OCOCH=CH$_2$ | D-244 |
| 1,3,5-R-substituted benzene | R = 3-methyl-1,2,4-thiadiazol-5-yl-phenyl-X | —O(CH$_2$)$_6$OCOCH=CH$_2$ | D-245 |
| 1,3,5-R-substituted benzene | R = 3-methylisothiazol-5-yl-phenyl-X | —O(CH$_2$)$_6$OCOCH=CH$_2$ | D-246 |
| 1,3,5-R-substituted benzene | R = 4-methylthiazol-2-yl-phenyl-X | —O(CH$_2$)$_6$OCOCH=CH$_2$ | D-247 |

-continued

| | | |
|---|---|---|
| [1,3,5-trisubstituted benzene with R groups; R = 5-methyl-3-(4-X-phenyl)-1,2,4-oxadiazole] | X = —C$_8$H$_{17}$ | D-248 |
| | [—C$_6$H$_4$—OC$_8$H$_{17}$] | D-249 |
| | [trans-cyclohexyl—C$_5$H$_{11}$] | D-250 |
| | —COO—C$_6$H$_4$—OC$_8$H$_{17}$ | D-251 |
| | —OCO—C$_6$H$_4$—OC$_8$H$_{17}$ | D-252 |
| | —CH=CH—C$_6$H$_4$—OC$_8$H$_{17}$ | D-253 |
| | —C≡C—C$_6$H$_4$—OC$_8$H$_{17}$ | D-254 |
| | —OCO—CH=CH—C$_6$H$_4$—OC$_8$H$_{17}$ | D-255 |
| | —(CH$_2$)$_2$OCOCH=CH$_2$ | D-256 |
| | —COO(CH$_2$)$_4$OCOCH=CH$_2$ | D-257 |
| | —C$_6$H$_4$—O(CH$_2$)$_4$OCOCH=CH$_2$ | D-258 |
| | —COO—C$_6$H$_4$—O(CH$_2$)$_4$OCOCH=CH$_2$ | D-259 |
| | —OCO—C$_6$H$_4$—O(CH$_2$)$_4$OCOCH=CH$_2$ | D-260 |
| | —CH=CH—C$_6$H$_4$—O(CH$_2$)$_4$OCOCH=CH$_2$ | D-261 |
| | —C≡C—C$_6$H$_4$—O(CH$_2$)$_4$OCOCH=CH$_2$ | D-262 |
| | —OCO—CH=CH—C$_6$H$_4$—O(CH$_2$)$_4$OCOCH=CH$_2$ | D-263 |

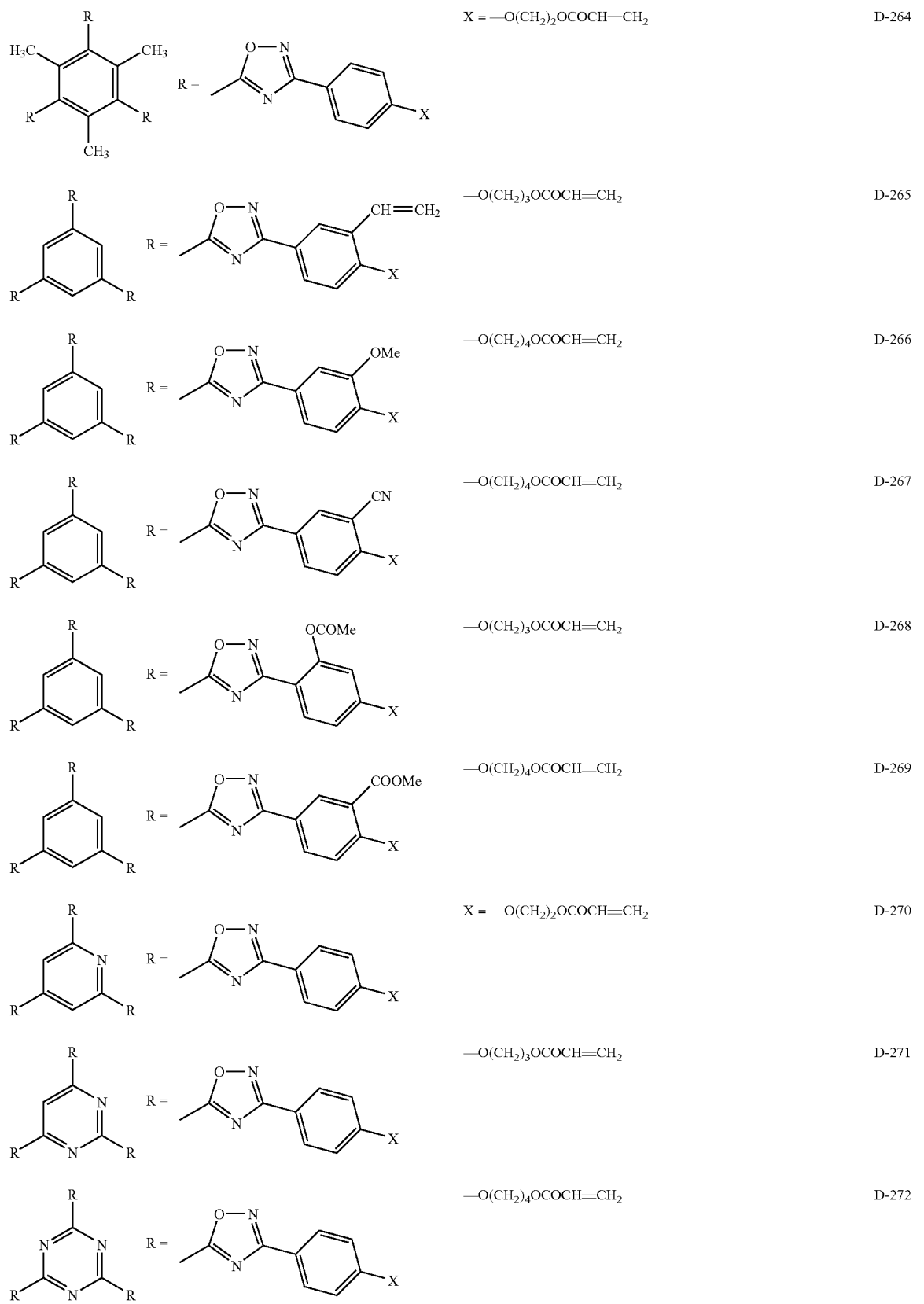

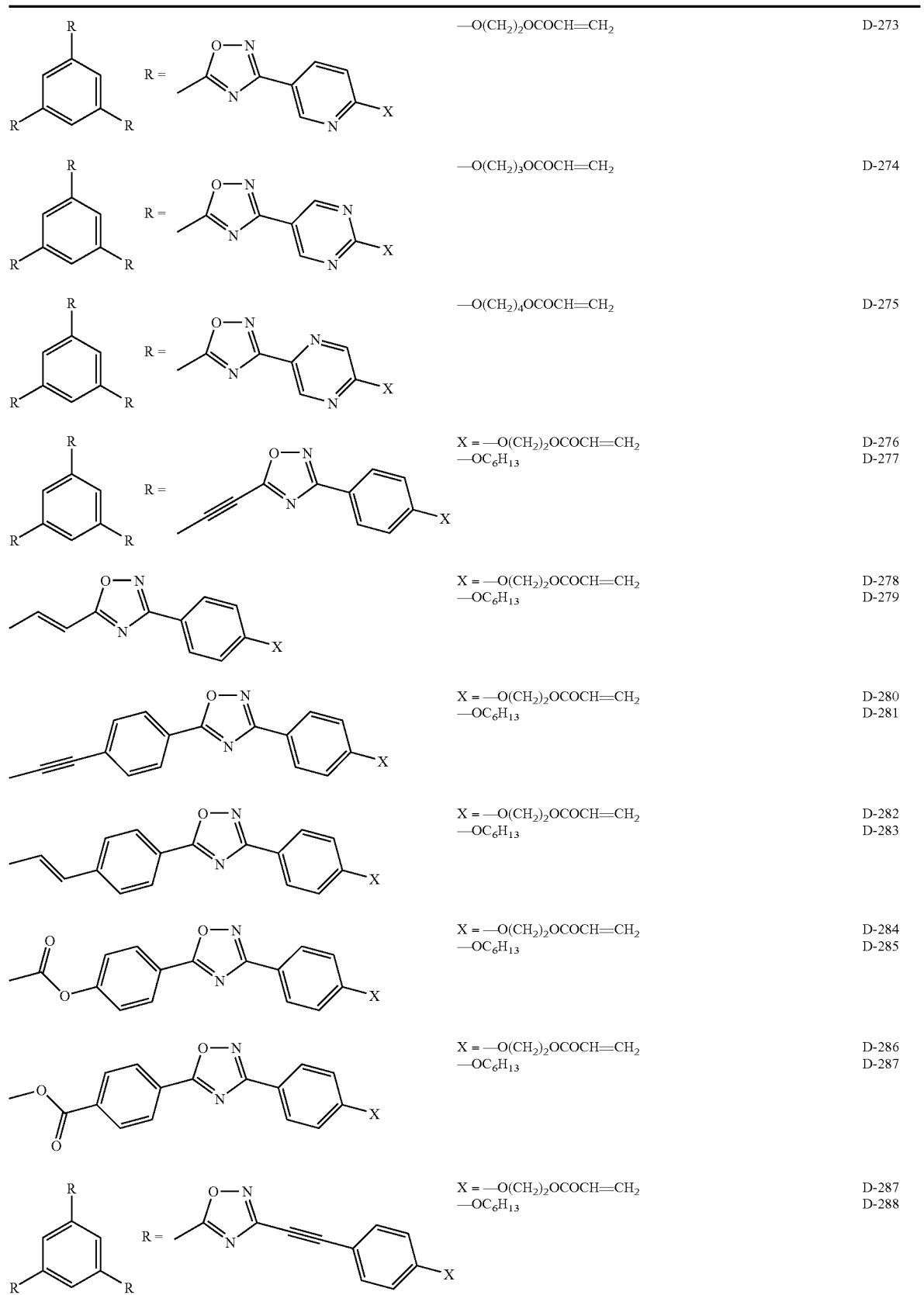

-continued

| Structure | X values | Code |
|---|---|---|
| 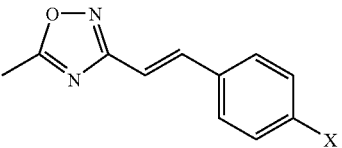 | X = —O(CH$_2$)$_2$OCOCH=CH$_2$<br>—OC$_6$H$_{13}$ | D-289<br>D-290 |
| 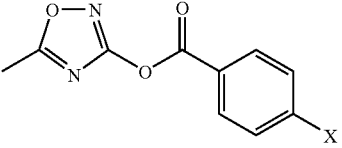 | X = —O(CH$_2$)$_2$OCOCH=CH$_2$<br>—OC$_6$H$_{13}$ | D-291<br>D-292 |
| 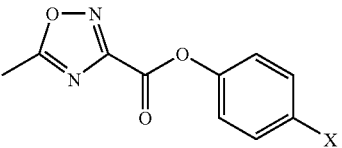 | X = —O(CH$_2$)$_2$OCOCH=CH$_2$<br>—OC$_6$H$_{13}$ | D-293<br>D-294 |
| 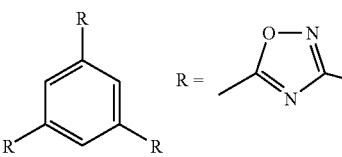 | X = —OC$_6$H$_{13}$<br>—OCOC$_5$H$_{11}$<br>—OCOOC$_4$H$_9$<br>—O(CH$_2$)$_4$OCOCH=CH$_2$<br>—O(CH$_2$)$_6$OCOCH=CH$_2$<br>—OCO(CH$_2$)$_3$OCOCH=CH$_2$<br>—OCO(CH$_2$)$_4$OCOCH=CH$_2$<br>—OCOO(CH$_2$)$_2$OCOCH=CH$_2$<br>—OCOO(CH$_2$)$_4$OCOCH=CH$_2$<br>—OCOO(CH$_2$CH$_2$O)$_2$COCH=CH$_2$ | D-295<br>D-296<br>D-297<br>D-298<br>D-299<br>D-300<br>D-301<br>D-302<br>D-303<br>D-304 |
| 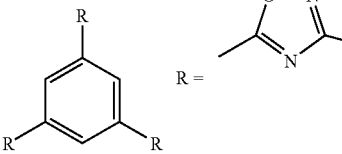 | X = —OC$_6$H$_{13}$<br>—OCOC$_5$H$_{11}$<br>—OCOOC$_4$H$_9$<br>—O(CH$_2$)$_4$OCOCH=CH$_2$<br>—O(CH$_2$)$_6$OCOCH=CH$_2$<br>—OCO(CH$_2$)$_3$OCOCH=CH$_2$<br>—OCO(CH$_2$)$_4$OCOCH=CH$_2$<br>—OCOO(CH$_2$)$_2$OCOCH=CH$_2$<br>—OCOO(CH$_2$)$_4$OCOCH=CH$_2$<br>—OCOO(CH$_2$CH$_2$O)$_2$COCH=CH$_2$ | D-305<br>D-306<br>D-307<br>D-308<br>D-309<br>D-310<br>D-311<br>D-312<br>D-313<br>D-314 |
| 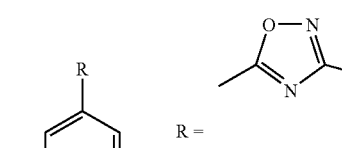 | X = —OC$_6$H$_{13}$<br>—OCOC$_5$H$_{11}$<br>—OCOOC$_4$H$_9$<br>—O(CH$_2$)$_4$OCOCH=CH$_2$<br>—O(CH$_2$)$_6$OCOCH=CH$_2$<br>—OCO(CH$_2$)$_3$OCOCH=CH$_2$<br>—OCO(CH$_2$)$_4$OCOCH=CH$_2$<br>—OCOO(CH$_2$)$_2$OCOCH=CH$_2$<br>—OCOO(CH$_2$)$_4$OCOCH=CH$_2$<br>—OCOO(CH$_2$CH$_2$O)$_2$COCH=CH$_2$ | D-315<br>D-316<br>D-317<br>D-318<br>D-319<br>D-320<br>D-321<br>D-322<br>D-323<br>D-324 |
|  | X = —O(CH$_2$)$_4$OCOCH=CH$_2$<br>—OCOO(CH$_2$)$_4$OCOCH=CH$_2$<br>—OCOO(CH$_2$CH$_2$O)$_2$COCH=CH$_2$ | D-325<br>D-326<br>D-327 |
| 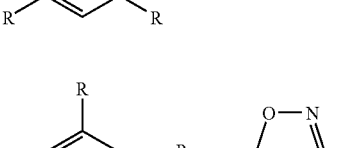 | X = —O(CH$_2$)$_4$OCOCH=CH$_2$<br>—OCOO(CH$_2$)$_4$OCOCH=CH$_2$<br>—OCOO(CH$_2$CH$_2$O)$_2$COCH=CH$_2$ | D-328<br>D-329<br>D-330 |

-continued

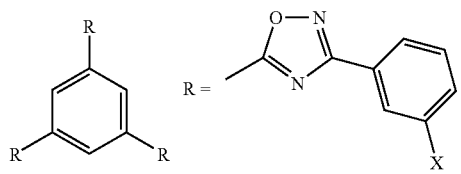

| | |
|---|---|
| X = —COOC$_4$H$_9$ | D-331 |
| —COOC$_5$H$_{11}$ | D-332 |
| —COOC$_6$H$_{13}$ | D-333 |
| —COO(CH$_2$)$_2$OCOCH=CH$_2$ | D-334 |
| —COO(CH$_2$)$_3$OCOCH=CH$_2$ | D-335 |
| —COO(CH$_2$)$_4$OCOCH=CH$_2$ | D-336 |
| —COO(CH$_2$)$_5$OCOCH=CH$_2$ | D-337 |
| —COO(CH$_2$)$_6$OCOCH=CH$_2$ | D-338 |
| —COO(CH$_2$)$_7$OCOCH=CH$_2$ | D-339 |
| —COO(CH$_2$)$_8$OCOCH=CH$_2$ | D-340 |
| —COO(CH$_2$CH$_2$O)$_2$COCH=CH$_2$ | D-341 |
| —COO(CH$_2$)$_2$CH(CH$_3$)OCOCH=CH$_2$ | D-342 |
| —COO(CH$_2$)$_3$CH(CH$_3$)OCOCH=CH$_2$ | D-333 |
| —COO(CH$_2$)$_4$CH(CH$_3$)OCOCH=CH$_2$ | D-334 |
| —COOCH$_2$CH(CH$_3$)CH$_2$OCOCH=CH$_2$ | D-335 |
| —COO(CH$_2$)$_2$CH(CH$_3$)(CH$_2$)$_2$OCOCH=CH$_2$ | D-336 |
| —COOCH(CH$_3$)(CH$_2$)$_2$OCOCH=CH$_2$ | D-337 |
| —COO(CH$_2$)$_5$OCOC(CH$_3$)=CH$_2$ | D-338 |
| —COO(CH$_2$)$_4$OCH=CH$_2$ | D-339 |
| —COO(CH$_2$)$_4$—CH—CH$_2$ (epoxide) | D-340 |

The above composition may comprise any other discotic liquid-crystal compound, in addition to the discotic liquid-crystal compound of formula (I) or (DI). Examples of liquid-crystalline compounds are described in the above-mentioned references.

Preferably, the composition is a polymerizable composition, and for this, it is desirable that the composition comprises at least a polymerizable component (in an embodiment where the discotic liquid-crystal compound in the composition is a polymerizable compound, then the composition does not require any additional polymerizable component) and a polymerization initiator. Photo-polymerization initiators are more preferable. Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of triarylimidazole dimer and p-aminophenyl ketone (those described in U.S. Pat. No. 3,549,367), acrydine and phenazine compounds (those described in Japanese Laid-Open Patent Publication "Tokkai" No. S60-105667 and U.S. Pat. No. 4,239,850), and oxadiazole compounds (those described in U.S. Pat. No. 4,212,970).

The amount of the polymerization initiator in the composition is preferably from 0.01 to 20 mass %, and more preferably from 0.5 to 10 mass % with respect to the total mass of the composition (the total mass of the solid content when the composition is a coating fluid).

In addition, the composition may further contain a sensitizer for sensitizing the polymerization initiator, a surfactant that participates in bettering the coatability of the composition when it is prepared as a coating liquid, and an alignment promoter for promoting the alignment of liquid-crystal molecules.

The optically anisotropic film of the invention may be prepared as follows.

The composition may be prepared as a coating fluid. The coating fluid is applied to a surface of a substrate or the like, dried to align molecules of the discotic liquid crystal in a desired alignment state, and fixed the alignment state by carrying out a polymerization or the like. Organic solvents are preferably used for preparing the coating fluid. Examples of the organic solvent include amides such as N,N-dimethyl formamide, sulfoxides such as dimethyl sulfoxide, heterocyclic compounds such as pyridine, hydrocarbons such as benzene and hexane, alkyl halides such as chloroform and dichloromethane, esters such as methyl acetate and butyl acetate, ketones such as acetone and methyl ethyl ketone, ethers such as tetrahydrofuran and 1,2-dimethoxy ethane. Among those, alkyl halides, esters and ketones are preferable; and esters and ketones are especially preferable. Two or more types of organic solvents may be used. The coating fluid maybe applied to the surface according to any known method such as an extrusion coating method, direct gravure coating method, reverse gravure coating method, and die coating method.

The optically-anisotropic film of the invention may be formed by preparing the composition as a fluid such as ink, then jetting out the fluid onto the surface of a substrate through an inkjet-type head and drying it to give a liquid-crystal phase thereon, and fixing the alignment state of the liquid-crystal phase on the substrate. According to the process, an optically-anisotropic film having an extremely small area may be formed, and therefore, for example, the process is useful for forming an optically-anisotropic film as divided in fine regions corresponding to the individual color layers of a color filter in a liquid-crystal cell (as a so-called in-cell color filter). In addition, the process is further advantageous in that, by changing the ink composition and by changing the film thickness (for example, by changing the ink jet amount), an optically-anisotropic film having an optimized retardation depending on the wavelength of a color filter may be formed.

In terms of widening viewing angles, the retardation of the film formed on each color of a color filter is preferably as follows: In every color for the R, G and B wavelength of a color filter, the value obtained by multiplying the resulting value, which is obtained by dividing each retardation by each wavelength, by 2π is preferably from 50° to 130°, more preferably from 60° to 125°, even more preferably from 65° to 120°.

In embodiments where the composition comprises a photopolymerization initiator, then its polymerization is initiated by photoirradiation. UV rays are preferably used for the photoirradiation. The irradiation energy is preferably from 20 mJ/cm² to 50 J/cm², more preferably from 100 to 800 mJ/cm². For promoting the photopolymerization reaction, the photoirradiation may be effected under heat.

Not specifically defined, the thickness of the optically-anisotropic film of the invention is preferably from 0.1 to 10 μm, more preferably from 0.5 to 5 μm. The film thickness may have some influences on the properties of the optically-anisotropic film, and depending on the discotic liquid-crystal compound selected for the film, the film thickness must be large for forming the optically-anisotropic film satisfying predetermined requirements. In case where a discotic liquid-crystal compound of the above formula (I) or (DI) is used, the optically-anisotropic film formed may have Re at a wavelength of 550 nm of from 60 to 220 nm and have a mean tilt angle falling within the above range even when the film is thin having a film thickness of from 0.5 to 2.5 μm or so.

In forming the optically-anisotropic film of the invention, an alignment layer may be used for aligning molecules of the discotic liquid-crystal compound in a predetermined alignment state. Preferred examples of the alignment layer are polyvinyl alcohol or modified polyvinyl alcohol alignment layers, polyimide alignment layers, and optical alignment layers.

In the optically-anisotropic film of the invention, the molecules of the discotic liquid-crystal compound are fixed therein, as aligned at a mean tilt angle ranging from 35 to 85°. In the optically-anisotropic film of the invention, the mean tilt angle of the discotic liquid-crystal molecules is from 35° to 85°, preferably from 37° to 70°, more preferably from 40° to 60°. When the mean tilt angle falls within a range of from 35° to 85°, then the film may have good optical properties as a λ/4 plate. In case where the optically-anisotropic film is composed of 2 or more layers, then the mean tilt angle may fall within the above range as a whole of the optically-anisotropic film, or that is, the above requirement does not mean that the mean tilt angle of every constitutive layer of the film must fall within the above range.

In the optically-anisotropic film of the invention, the discotic liquid-crystal molecules preferably has a region in which they are so fixed that their tilt angle varies in the direction of the thickness of the film, or that is, they are fixed as a nematic hybrid alignment state. "Nematic hybrid alignment" is meant to indicate an alignment state where liquid-crystalline molecules are nematic-aligned and the mean angle of the liquid-crystalline molecules differs between the upper face and the lower face of the film. Preferably, the optically-anisotropic film of the invention has a region in which the discotic liquid-crystal molecules in the film are fixed in a nematic hybrid alignment state in such a manner that the mean angle of the discotic liquid-crystal molecules differs between the vicinity of the upper face of the film and the vicinity of the lower face thereof and the difference therebetween is at least 5°. Within the above region, it is desirable that the tilt angle continuously varies in the direction of the thickness of the film. In one embodiment of the optically-anisotropic film of the invention, the discotic liquid-crystal molecules in the film are fixed in a nematic hybrid alignment state where the tile angle of the molecules continuously increases from one face of the film toward the other face thereof.

In the optically-anisotropic film of the invention, the discotic liquid-crystal molecules may have a region in which they are fixed in a uniform nematic alignment state with no chance in their tilt angle in the film thickness direction. For example, in the film, the discotic liquid-crystal molecules may have a region in which they are fixed in a uniform nematic alignment state in such a manner that they are uniformly aligned with their discotic face kept nearly vertically to the film face. One embodiment of the optically-anisotropic film of the invention is a laminate comprising a layer where the discotic liquid-crystal molecules are fixed in the above hybrid alignment state and a layer where the molecules are fixed in the above uniform nematic alignment state. In case where the discotic liquid-crystal molecules of the above formula (I) or (DI) are used, the optically-anisotropic film of the embodiment may be readily formed. Concretely, a composition containing the above discotic compound is applied onto the surface of a support, thereby forming thereon a layer in which the discotic molecules are fixed in a nematic hybrid alignment state where the tilt angle of the discotic molecules continuously varies from the lower face toward the upper face (hereinafter this may be referred to as "nematic hybrid alignment liquid-crystal layer"), and thereafter the above composition is further applied onto the upper face of the layer. In this case, even when an alignment layer is not used, the discotic liquid-crystal molecules disposed on the previously formed, nematic hybrid alignment liquid-crystal layer may be aligned at a large tilt angle as being influenced by the aligned discotic liquid-crystal molecules existing in the vicinity of the upper interface on that nematic hybrid alignment liquid-crystal layer. As a result, a uniform nematic alignment liquid-crystal layer having a large tilt angle may be formed on the nematic hybrid alignment liquid-crystal layer.

The optically-anisotropic film of the invention has an in-plane retardation Re, as measured in the normal direction of the film face for 550 nm light, of from 60 nm to 220 nm, preferably from 80 to 200 nm, more preferably from 100 to 180 nm.

Preferably, the optically anisotropic film of the invention has the ratio, α2 of retardation (Re) at a wavelength of 400 nm to Re at a wavelength of 550 nm is less than 1.25, more preferably equal to or less tan 1.22, even more preferably equal to or less than 1.20.

The optically-anisotropic film of the invention may be built in a liquid-crystal display device, singly as a λ/4 plate by itself, or as a member integrated with any other retardation plate or a polarizer. The liquid-crystal display device that comprises the optically-anisotropic film of the invention is described below.

[Liquid-Crystal Display Device]

The optically-anisotropic film of the invention may be built in a liquid-crystal display device, singly as a λ/4 plate by itself. The film may be laminated with an optically-anisotropic layer or a polymer film capable of functioning as a λ/2 plate, and the resulting retardation plate may be built in a liquid-crystal display device. The optically-anisotropic film of the invention or the retardation plate comprising the film may be combined with a polarizing element to produce an elliptically-polarizing plate, and this may be built in a liquid-crystal display device.

Not specifically defined, the λ/2 plate to be combined with the optically-anisotropic film of the invention may be any known optically-anisotropic layer and/or polymer film capable of functioning as a λ/2 plate. One example of the λ/2 plate has a retardation at a wavelength of 550 nm of from 200 to 350 nm and has an Nz factor=(nx−nz)/(nx−ny) of from 0.5 to 2.0. One embodiment of the λ/2 plate of the type is an optically-anisotropic film in which liquid-crystal molecules having positive optical anisotropy are horizontally aligned, and another embodiment is a stretched polymer film. In the embodiment where the above λ/2 plate is a polymer film, the optically-anisotropic film of the invention may be stuck to the polymer film serving as a support, and thus, the optically-anisotropic film of the invention is formed on the polymer film support as an optically-anisotropic layer thereon. The retardation plate comprising the optically-anisotropic film of the invention may further has any other optically-anisotropic layer. A preferred example of the additional optically-anisotropic layer is an optically-anisotropic layer having retardation Rth in the thickness direction at a wavelength of 589.3 nm of from 0 to 300 nm. The optically-anisotropic layer may be formed of any material of liquid-crystalline molecules or polymer molecules (e.g., triacetyl cellulose and/or cyclic polyolefin).

The liquid crystal display device of the invention may employ any display mode such as TN (Twisted Nematic) mode, STN (SuperTwisted Nematic) mode, ECB (Electrically Controlled Birefringence) mode, IPS(In-Plane Switching) mode, VA (Vertical Alignment) mode, MVA (Multidomain Vertical Alignment) mode, PVA (Patterned Vertical Alignment) mode, OCB (Optically Compensated Birefringence) mode, HAN (Hybrid Aligned Nematic) mode, ASM (Axially Symmetric Aligned Microcell) mode, Half Tone Gray Scale mode, Domain-Divided mode, and any displaying modes employing ferroelectric or anti-ferroelectric liquid crystal. The driving mode of the liquid crystal cell is not limited, and a passive matrix mode which may be employed in a STN-LCD or the like, an active matrix mode employing active electrode such as TFT (Thin Film Transistor) electrodes and TFD (Thin Film Diode) electrodes, and plasma-address mode. A field sequential mode without any color filter may also be employed.

The embodiments which provide a black state while being applied with voltage are preferred in terms of widening viewing angles effectively.

The optically-anisotropic film of the invention, or the retardation plate or the elliptically-polarizing plate comprising the film is preferably used in a liquid-crystal display device that provides a black state while being applied with voltage. Preferably, the film or the plate is disposed so that the mean direction of the axes, which are projected on the liquid-crystal cell substrate surface, of the director of the discotic liquid-crystal molecules therein is substantially parallel to the mean direction of the axes, which are projected on the liquid-crystal cell substrate surface, of the director of the liquid-crystal molecules in the liquid-crystal cell in a black state.

The optically-anisotropic film of the invention or the retardation plate comprising it may be disposed generally between the liquid crystal cell and the polarizing element in a transmissive-type or reflective/transmissive-type liquid-crystal display device. The film or the plate may have a so-called in-cell constitution, or that is, the optically-anisotropic film of the invention or the retardation plate comprising it may be disposed inside the liquid-crystal cell. One embodiment of such an in-cell type, reflective/transmissive-type liquid-crystal display device comprises a backlight disposed at a backside thereof, a pair of substrates, a liquid-crystal layer held between the pair of substrates and a color filter with reflective regions and transmissive regions, wherein the optically-anisotropic film of the invention or the retardation plate comprising it is disposed between the pair of substrates and in each of the transmissive regions, and retardation of each optically-anisotropic film varies depending on the wavelength of the color filter. In the liquid-crystal display device having such a constitution, it is desirable that the optically-anisotropic film is directly formed on the substrate of the liquid-crystal cell according to an inkjet process, as so mentioned hereinabove.

EXAMPLES

Paragraphs below will further specifically explain features of the present invention referring to Examples and Comparative Examples. Materials, amount of use, ratio, details of processing, procedures of processing and the like shown in Examples below may appropriately be modified without departing from the spirit of the present invention. It is therefore understood that the scope of the present invention should not limitedly be interpreted based on the specific examples shown below.

Example 1

(Production of Discotic Liquid-Crystal Compound DLB-1)

This was produced according to the following scheme:

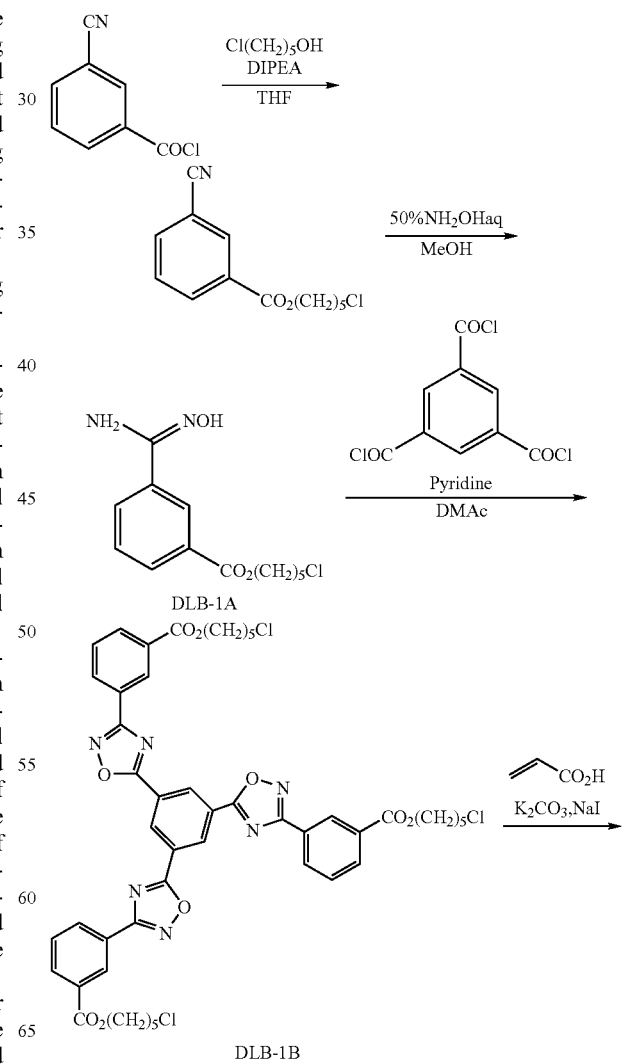

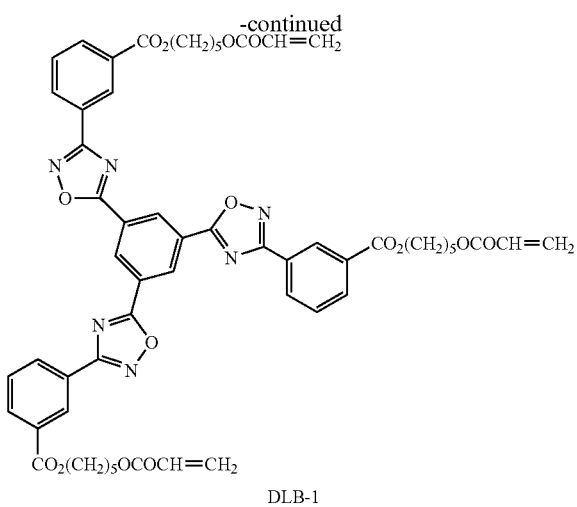

DLB-1

(Production of DLB-1A)

2.5 g of 3-cyanobenzoic acid chloride was dissolved in 20 ml of tetrahydrofuran (THF), then 1.3 ml of 5-chloro-1-pentanol and 3.0 ml of diisopropylethylamine (DIPEA) were added thereto, and stirred at room temperature for 1 hour. Water was added to the reaction liquid, extracted with ethyl acetate, and the organic layer was concentrated under reduced pressure. The residue was dissolved in 100 ml of methanol (MeOH), then 2.8 ml of 50% hydroxylamine solution was added thereto, and stirred at 40° C. for 1 hour. After cooled, water was added to the reaction liquid, and the precipitated crystal was taken out through filtration and dried to obtain 3.4 g of DLB-1A.

(Production of DLB-1B)

3.4 g of DLB-1A was dissolved in 10 ml of dimethylacetamide (DMAc), then 1.2 ml of pyridine and 1.2 g of trimesic acid chloride was added thereto, and stirred at 120° C. for 1 hour. After cooled, methanol was added to it, and the precipitated crystal was taken out through filtration and dried to obtain 3.9 g of DLB-1B.

(Production of DLB-1)

3.9 g of DLB-1B was dissolved in 50 ml of dimethylacetamide, then 3.7 g of potassium carbonate, 2.0 g of sodium iodide and 1.9 ml of acrylic acid were added thereto, and stirred at 100° C. for 3 hours. Water was added to the reaction liquid, and the precipitated crystal was taken out through filtration. This was purified through column chromatography to obtain 3.0 g of DLB-1. The NMR spectrum of the obtained DLB-1 was as follows:

$^1$H-NMR (solvent: CDCl$_3$, standard: tetramethylsilane) δ (ppm): 1.60 (6H, m), 1.80-1.90 (12H, m), 4.25 (6H, t), 4.45 (6H, t), 5.80 (3H, dd), 6.15 (3H, dd), 6.40 (3H, dd), 7.65 (3H, t), 8.25 (3H, d), 8.45 (3H, d), 8.90 (3H, s), 9.30 (3H, s).

The phase transition temperature of the obtained DLB-1 was measured through texture observation with a polarizing microscope. While it was heated, the liquid-crystal phase changed to a discotic-nematic liquid-crystal phase at around 86° C., and over 142° C., the phase further changed to an isotropic liquid phase. Specifically, it was known that DLB-1 exhibits a discotic-nematic liquid-crystal phase at a temperature between 86° C. and 142° C. The liquid crystal was vertically aligned in a thickness of 1 μm, and its retardation was measured in a liquid-crystal state at 100° C. At 400 nm, the retardation was 161 nm and the birefringence (anisotropy of refractive indices) was 0.161; and at 550 nm, the retardation was 140 nm and the birefringence was 0.140; and the birefringence ratio α1 was 1.15.

(Formation of Retardation Plate)

A triacetyl cellulose film having a thickness of 60 μm was used as an optically-anisotropic layer C1. Rth of the triacetyl cellulose film at 589.3 nm, as measured with a birefringence meter (Oji Scientific Instruments' KOBRA-21ADH), was 80 nm. One face of the triacetyl cellulose film was saponified, and an alignment layer-coating liquid having the composition mentioned below was applied thereonto. This was dried with hot air at 60° C. for 60 seconds, and then with hot air at 100° C. for 120 seconds, thereby forming a film thereon. Next, the formed film was rubbed (with a rubbing cloth rotating at 1500 rpm) to be an alignment layer.

| Composition of Alignment Layer-Coating Liquid H1 | |
|---|---|
| Modified polyvinyl alcohol mentioned below | 10 mas. pts. |
| Water | 371 mas. pts. |
| Methanol | 119 mas. pts. |
| Glutaraldehyde | 0.5 mas. pts. |

Modified Polyvinyl Alcohol:

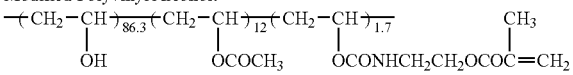

A coating liquid having the composition mentioned below was applied onto the rubbed face of the alignment layer, then dried and heated at 110° C. for 90 seconds (alignment aging), and further irradiated with UV rays at 90° C., thereby forming an optically-anisotropic layer B1 having a thickness of 2.3 μm.

| Composition of Coating Liquid for Optically-anisotropic Layer B1 | |
|---|---|
| Discotic Liquid-crystal Compound DLB-1 | 93 mas. pts. |
| Discotic Liquid-crystal Compound D-1 mentioned below | 7 mas. pts. |
| Sensitizer (Kayacure DETX, by Nippon Kayaku) | 1 mas. pts. |
| Photopolymerization Initiator (Irgacure 907, by Ciba-Geigy) | 3 mas. pt. |
| Methyl Ethyl Ketone | 200 mas. pts. |

Discotic Liquid-crystal Compound D-1:

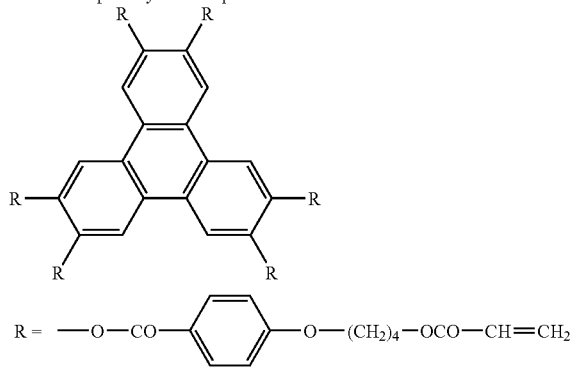

The formed optically-anisotropic layer B1 was visually observed under cross Nicol, and this exhibited high alignment uniformity with no alignment defect therein.

The optically-anisotropic layer B1 (optically-anisotropic film of the invention) was formed on glass in the same manner as above, and its optical properties were confirmed. As a result, the optically-anisotropic layer B1 had a slow axis in the direction perpendicular to the rubbing direction. The retardation of the layer at 400 nm and 550 nm in the normal direction to the film surface was 177 nm and 150 nm, respectively, and the birefringence ratio α2 was 1.18. Next, the in-plane retardation Re and the inclined retardation Re of the layer when the sample was inclined by ±40 degrees around the slow axis as the rotation axis were measured, and the mean tilt angle of the optically-anisotropic layer was calculated. As a result, the mean tilt angle was 48° and the discotic liquid-crystal molecules were in hybrid alignment in the layer.

Next, a monoaxially-stretched Arton film (by JSR) was used as an optically-anisotropic layer A1 (λ/2 plate). The optical axis was in parallel to the film face, and the retardation at 550 nm was 260 nm. The Nz factor was 1.0.

A laminate of the optically-anisotropic layer B1 and the optically-anisotropic layer C1 produced in the above was stuck to the optically-anisotropic layer A1, the Arton film with an adhesive. These were stuck in an order of the optically-anisotropic layer A1, the optically-anisotropic layer B1 and the optically-anisotropic layer C1, and the slow axis of the optically-anisotropic layer A1 crossed the slow axis of the optically-anisotropic layer B1 at an angle of 60°.

(Formation of Elliptically-Polarizing Plate)

A rolled polyvinyl alcohol film having a thickness of 80 μm was stretched continuously 5-fold in an aqueous iodine solution, and dried to obtain a polarizing film. Using an aqueous 3% polyvinyl alcohol (Kuraray's PVA-117H) solution as an adhesive, this was stuck to a saponified triacetyl cellulose film, thereby obtaining a polarizer protected with triacetyl cellulose on both surfaces thereof. The Rth value of the triacetyl cellulose film used herein was 30 nm.

Figure 2:
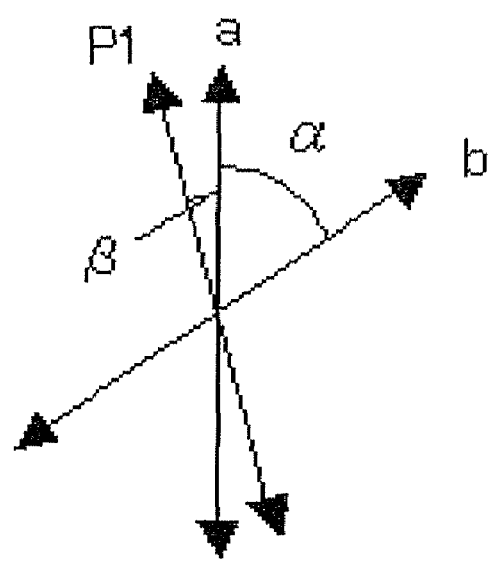
FIG. 2 is a plan view showing the direction of the slow axis of the optically-anisotropic layer and the direction of the polarized light transmission axis of the polarizing film of the elliptically-polarizing plate of FIG. 1.

Next, the retardation plate (laminate of optically-anisotropic layer A1, optically-anisotropic layer B1 and optically-anisotropic layer C1) and the polarizer produced in the above were stuck together with an adhesive to form an elliptically-polarizing plate 1. In this, the optically-anisotropic layer A1 faced the polarizer, and the angle formed by the transmission axis of the polarizer and the slow axis of the optically-anisotropic layer A1 and the optically-anisotropic layer B1 was 75° and 15°, respectively. Accordingly, the thus-formed elliptically-polarizing plate has a layer constitution as in FIG. 1. With reference to FIG. 2, β of the elliptically-polarizing plate was 15° and α thereof was 60°.

(Formation of Liquid-Crystal Display Device)

With the above-produced, elliptically-polarizing plate built therein, an ECB reflective/transmissive-type display device was constructed.

First, a pair of glass substrates having a thickness of 0.7 mm were combined, facing each other via a gap of 4 μm therebetween. On the glass substrate on the viewers' side, formed was an ITO electrode; and on the other glass substrate, formed was an uneven aluminium reflective electrode serving as a counter electrode to the ITO electrode. On the facing surfaces of the upper and lower substrates, formed was an alignment layer of a surface-rubbed polyimide film. The rubbing angle of the alignment layers for the upper and lower substrates was in parallel to each other (twisting angle, 0 degree). Into the gap of the glass substrates, a nematic liquid crystal having Δn=0.086 and having a dielectric anisotropy of +10.0 was injected, thereby producing a liquid-crystal cell.

Figure 3:
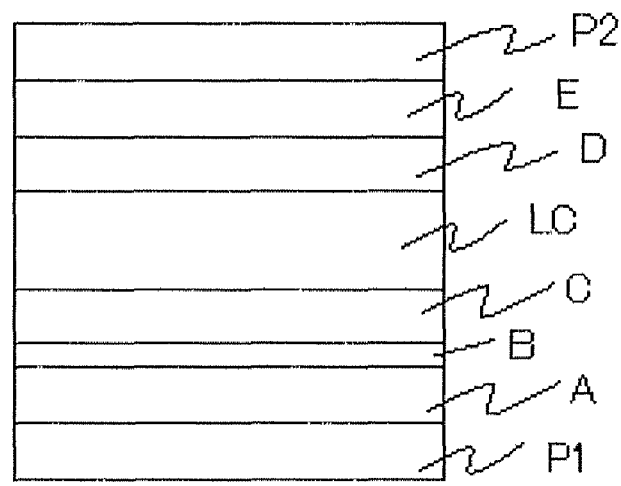
FIG. 3 is a schematic cross-sectional view showing the layer constitution of a liquid-crystal display device, produced in Examples.

Using the liquid-crystal cell, a liquid-crystal display device having a layer constitution as in FIG. 3 was produced. Below the liquid-crystal cell LC, disposed was the previously-produced, elliptically-polarizing plate 1 in such a manner that the director direction (direction perpendicular to the slow axis) of the optically-anisotropic layer B1 could be in parallel to the rubbing direction of the upper and lower substrates of the liquid-crystal cell LC. Specifically, they were stuck together in such a manner that the mean direction of the axes of the director of the liquid-crystal molecules in the liquid-crystal cell LC at the time of black level of display, as projected on the layer-parallel surface, and the direction of the director of the hybrid-aligned discotic liquid-crystal molecules in the first optically-anisotropic layer, as projected on the layer-parallel surface, could be substantially in parallel to each other.

Figure 4:
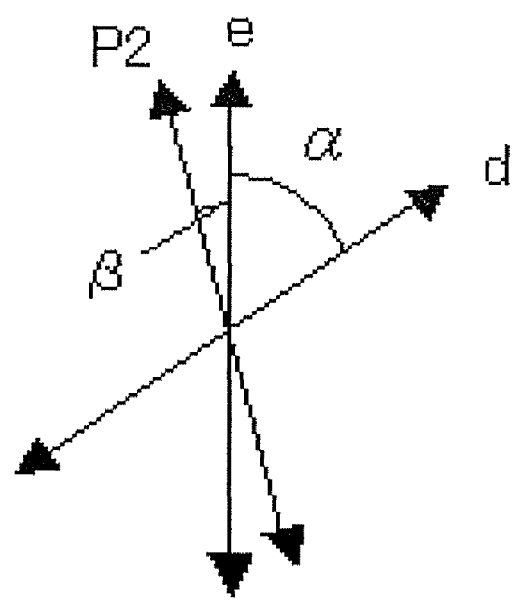
FIG. 4 is a plan view showing the direction of the slow axis of the upper optically-anisotropic layer (E, D) and the direction of the polarized light transmission axis of the upper polarizing film (P2) of the device of FIG. 3.

On the other hand, an optically-anisotropic layer D formed of the same Arton film as that for the optically-anisotropic layer A1 and having a retardation of 150 nm, and an optically-anisotropic layer E also formed of the same Arton film as above and having a retardation of 260 nm were laminated in such a manner that their slow axes of D and E could cross at 60°, and further, a linearly-polarizing plate P2 was stuck thereto in such a manner that its transmission axis could cross the slow axis of the optically-anisotropic layer E at 15°, thereby forming a laminate. Then, the laminate was combined with the previously-produced structure in such a manner that slow axis of the optically-anisotropic layer D could be in parallel to the rubbing direction of the upper and lower substrates of the liquid-crystal cell LC. FIG. 4 shows the relationship between the slow axis d of the optically-anisotropic layer D on the upper side of the liquid-crystal cell, the slow axis e of the optically-anisotropic layer E, and the transmission axis p2 of the polarizer P2. In the liquid-crystal display device produced herein, the crossing angle β between the slow axis e of the optically-anisotropic layer E and the transmission axis p2 of the linearly-polarizing plate P2 was 15°; and the crossing angle α between the slow axis e of the optically-anisotropic layer E and the slow axis d of the optically-anisotropic layer D was 60°.

Next, as the backlight of the cathode ray tube for a color liquid-crystal display device, produced was a white, three-wavelength fluorescent lamp having a desired color tone, using a phosphor mixture of $BaMg_2Al_{16}O_{27}$:Eu,Mn and $LaPO_4$:Ce,Tb (50/50 by weight) as green (G), a phosphor of $Y_2O_3$:Eu as red (R), and a phosphor of $BaMgAl_{10}O_{17}$:Eu as blue (B). A diffuser and a collector were disposed on the backlight, and a liquid-crystal display device 1 was constructed on it.

Example 2

(Formation of Retardation Plate)

In the same manner as in the formation of the optically-anisotropic layer B1 in Example 1, a coating liquid having the composition mentioned below was applied onto the alignment layer according to a spin coating method, and dried and heated at 110° C. (alignment aging), and further irradiated with UV rays, thereby carrying out a polymerization to form an optically-anisotropic layer having a thickness of 0.80 μm. Then, the coating liquid having the composition mentioned below was applied onto it, and dried, and heated (alignment aging), and irradiated with UV rays in the same manner as above, thereby forming an optically-anisotropic layer B2 (optically-anisotropic film of the invention) having an overall thickness of 1.6 μm. The time taken for the alignment aging of each layer was at most 30 seconds, and in visual observation under cross Nicol, no alignment defect was found in the film and the film exhibited high alignment uniformity.

| Composition of Coating Liquid for Optically-Anisotropic Layer B2 | |
| --- | --- |
| Discotic Liquid-crystal Compound DLB-1 | 93 mas. pts. |
| Discotic Liquid-crystal Compound D-1 | 7 mas. pts. |
| Sensitizer (Kayacure DETX, by Nippon Kayaku) | 1 mas. pt. |
| Photopolymerization Initiator (Irgacure 907, by Ciba-Geigy) | 3 mas. pts. |
| Methyl Ethyl Ketone | 300 mas. pts. |

The optically-anisotropic layer B2 was formed on glass in the same manner as above, and its optical properties were confirmed. As a result, the optically-anisotropic layer B2 had a slow axis in the direction perpendicular to the rubbing direction. The in-plane retardation of the layer at 400 nm and 550 nm was 179 nm and 150 nm, respectively, and the birefringence ratio α2 was 1.19. Next, the in-plane retardation Re and the inclined retardation Re of the layer when the sample was inclined by ±40 degrees around the slow axis as the rotation axis were measured, and the mean tilt angle of the optically-anisotropic layer was calculated. As a result, the mean tilt angle was 72°.

An elliptically-polarizing plate 2 and a liquid-crystal display device 2 were produced in the same manner as in Example 1, except that the optically-anisotropic layer B2 was used in the place of the optically-anisotropic layer B1.

Example 3

(Preparation of Coating Liquid H2 For Alignment Layer)

A commercial polyamic acid solution (SE-150, by Nissan Chemical) was diluted with N-methylpyrrolidone to have a solid concentration of 2% by weight. This was filtered through a polypropylene filter having a pore size of 30 μm, thereby preparing an alignment layer-forming coating liquid H2.

(Preparation of Coating Liquid for Optically-Anisotropic Layer B3)

The compounds mentioned below were combined with a compound exemplified in the above, and mixed in the blend ratio shown below, thereby preparing a composition. This was filtered through a polypropylene filter having a pore size of 0.2 μm, thereby preparing a coating liquid B3 for a hybrid alignment optically-anisotropic layer B3.

| Composition of Coating Liquid for Optically-Anisotropic Layer B3 | |
| --- | --- |
| Discotic Liquid-Crystal Compound DLB-1 | 100 mas. pts. |
| Photopolymerization Initiator (Irgacure 907, by Ciba-Geigy) | 3 mas. pts. |
| Sensitizer (Kayacure DETX, by Nippon Kayaku) | 1 mas. pt. |
| Methyl Ethyl Ketone | 200 mas. pts. |

(Formation of Alignment Layer)

A substrate S1 was separately prepared, which had TFT on the backlight side thereof and had reflective electrodes (reflective regions) and light transmissive regions formed therein. The previously-prepared coating liquid H2 for alignment layer was spotwise applied to the recesses corresponding to each of the transmissive regions, using an piezo-system head, and dried, and then heated at 100° C. for 1 minute, thereby producing a backlight-side substrate S1. The alignment layer was 0.1 μm thick. Next, the formed alignment layer was rubbed.

(Formation of Optically-Anisotropic Layer B3)

The previously-prepared coating liquid for optically-anisotropic layer B3 was spotwise applied to the recesses of the alignment layer-formed substrate S1, using a piezo-system head. After the solvent was evaporated away, this was heated at 120° C. for alignment aging, thereby forming a layer having a uniform liquid-crystal phase. The time taken for the alignment ripening was at most 80 seconds, and in visual observation under cross Nicol, no alignment defect was found in the layer and the layer exhibited high alignment uniformity. Next, the temperature of the layer was lowered to 90° C., and the layer was then irradiated with UV rays (illuminance, 200 mW/cm$^2$; irradiation dose, 800 mJ/cm$^2$), using an ultra-high pressure mercury lamp in a nitrogen atmosphere having an oxygen concentration of at most 0.3%, thereby fixing the hybrid alignment state to form an optically-anisotropic layer B3.

The retardation corresponding to each pixel of R, G and B was controlled by controlling the dropwise jet amount of the coating liquid for the optically-anisotropic layer thereby to change the thickness of the optically-anisotropic layer to be formed. The thickness of the optically-anisotropic layer corresponding to the pixels R, G and B on each substrate was 1.2 μm, 1.7 μm and 2.2 μm, respectively.

(Retardation Measurement)

The optically-anisotropic layer B3 was separately formed on a different flat glass sheet in the same manner as above, and the in-plane retardation Re at a wavelength λ corresponding to B (450 nm), G (550 nm) and R (650 nm), and the inclined retardation Re thereof when the sample was inclined by ±40 degrees relative to the slow axis as the rotation axis were measured, and the mean tilt angle of the optically-anisotropic layer was calculated. As a result, the retardation at the wavelength λ corresponding to B, G and R was 134 nm, 164 nm and 194 nm, respectively. The phase angle was 107° at every wavelength, and the mean tilt angle was 48°. The in-plane retardation at 400 nm of the optically-anisotropic layer corresponding to G was 173 nm, and the birefringence ratio α2 was 1.15.

(Formation of Liquid-Crystal Display Device)

On a separately-prepared color filter substrate, formed was a transparent electrode film (thickness, 2000 angstroms) of ITO by sputtering. Further, an alignment layer of polyimide was formed on it, and this was subjected to anti-parallel rubbing treatment. Next, glass beads having a particle size of 4.1 μm were scattered on it. Further, in the position corresponding to the outer frame of a black matrix provided around the pixel group of the color filter, a spacer particles-containing epoxy resin sealant was printed, and this was combined with a color filer substrate and a backlight TFT-having substrate S1, and stuck together under a pressure of 10 kg/cm. Next, the stuck glass substrate was heated at 150° C. for 90 minutes, whereby the sealant was cured and a substrate laminate was thus produced. The substrate laminate was degassed in vacuum, and then restored under an atmospheric pressure, and a liquid crystal having a dielectric constant of +10 and Δn of 0.086 was injected into the space between the two glass substrates, thereby obtaining an ECB-mode liquid-crystal cell.

Two retardation films of stretched cycloolefin having a retardation of 250 nm and 97 nm, and Sanritz's polarizer, HLC2-2518 were stuck onto the viewers' side of the liquid-crystal cell. Further, the above polarizer was stuck to the backlight side of the liquid-crystal cell, thereby producing a liquid-crystal panel. The directional relationship between the slow axis of the retardation films and the absorption axis of the polarizer is as follows: When the absorption axis direction of the backlight-side polarizer is 90°, then the azimuth angle of the director of the liquid crystal in the liquid-crystal cell projected on the substrate surface is 45°, the azimuth angle of the director of the liquid crystal in the optically-anisotropic layer B3 projected on the substrate surface is 45°, the slow axis direction of the retardation film having a retardation of 97 nm is 49°, the slow axis direction of the retardation film having a retardation of 250 nm is 347°, and the absorption axis direction of the viewers' side polarizer is 151°.

Next, as the backlight of the cathode ray tube for a color liquid-crystal display device, produced was a white, three-wavelength fluorescent lamp having a desired color tone, using a phosphor mixture of $BaMg_2Al_{16}O_{27}$:Eu,Mn and $LaPO_4$:Ce,Tb (50/50 by weight) as green (G), a phosphor of $Y_2O_3$:Eu as red (R), and a phosphor of $BaMgAl_{10}O_{17}$:Eu as blue (B). The polarizer-disposed liquid-crystal panel was put on a structure constructed by disposing a diffuser and a collector on the backlight, thereby producing an ECB reflective/transmissive-type liquid-crystal display device.

The process gave an ECB reflective/transmissive-type liquid-crystal display device 3.

Comparative Example (Formation of Retardation Plate)

In the same manner as in Example 1, an optically-anisotropic layer B4 was formed in place of the optically-anisotropic layer B1, for which, however, a coating liquid having the composition mentioned below was used in place of the coating liquid used for forming the optically-anisotropic layer B1, and the thickness of the film formed after polymerization was changed to 4.9 μm. The alignment ripening took 10 minutes, and in visual observation under cross Nicol, some alignment defects were found in the film.

| Composition of Coating Liquid for Optically-Anisotropic Layer B4 | |
|---|---|
| Discotic Liquid-crystal Compound D-1 | 90 mas. pts. |
| Ethyleneoxide-modified Trimethylolpropane Triacrylate (V#360, by Osaka Organic Chemical) | 10 mas. pts. |
| Fluoropolymer (A) mentioned below | 0.4 mas. pts. |
| Sensitizer (Kayacure DETX, by Nippon Kayaku) | 1 mas. pt. |
| Photopolymerization Initiator (Irgacure 907, by Ciba-Geigy) | 3 mas. pts. |
| Methyl Ethyl Ketone | 150 mas. pts. |

Fluoropolymer (A):

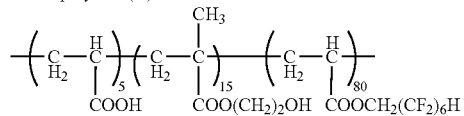

The optically-anisotropic layer B4 was formed on glass in the same manner as above, and its optical properties were measured. As a result, the optically-anisotropic layer B4 had a slow axis in the direction perpendicular to the rubbing direction. The in-plane retardation of the layer at 400 nm and 550 nm was 222 nm and 150 nm, respectively, and the birefringence ratio α2 was 1.48. Next, the in-plane retardation Re and the inclined retardation Re of the layer when the sample was inclined by ±40 degrees around the slow axis as the rotation axis were measured, and the mean tilt angle of the optically-anisotropic layer was calculated. As a result, the mean tilt angle was 48°, and it was known that the discotic liquid-crystal molecules were in hybrid alignment in the layer.

On the other hand, the liquid-crystal compound D-1 was vertically aligned in a thickness of 1 μm, and its retardation was measured in a liquid-crystal state at 160° C. At 400 nm, the retardation was 120 nm and the birefringence was 0.120; and at 550 nm, the retardation was 80 nm and the birefringence was 0.080; and the birefringence ratio α1 was 1.50.

In the same manner as in Example 1, an elliptically-polarizing plate 4 and a liquid-crystal display device 4 were produced, except that the optically-anisotropic layer B4 was used in the place of the optically-anisotropic layer B1.

[Evaluation]

(Viewing Angle Measurement)

Next, using a spectral radiation luminance meter in a dark room, the transmission luminance of the reflective/transmissive-type liquid-crystal display device was measured. In this, the observation angle was as follows: The liquid-crystal display device was kept horizontal, the polar angle was fixed at intervals of 10° in the direction to 0 to 80° with respect to the normal direction, and luminance of the liquid-crystal display device was measured at each angle with the azimuth angle varying at intervals of 10° in each of ON and OFF states. And, the contrast ratio, or that is the ratio of luminance in the ON state to luminance in the OFF state was calculated from the data. The data of the contrast ratio at every polar angle and at every azimuth angle were summed up in all directions, and the resulting value was divided by the number of the overall measurement points, 281. The liquid-crystal display devices 1 to 3 of Examples had the data of 138, 142 and 188, respectively; while the liquid-crystal display device 4 of Comparative Example had the data of 110. When the data are larger, then the devices may have a large contrast ratio at a broader viewing angle. Accordingly, it is understandable that, as compared with the liquid-crystal display device 4 of Comparative Example, the liquid-crystal display devices 1 to 3 of Examples of the invention had a higher contrast within a broader viewing angle range.

What is claimed is:

1. An optically-anisotropic film formed of a composition comprising at least one discotic liquid-crystal compound having a ratio, α1, which is a ratio of birefringence at 400 nm to birefringence at 550 nm in a liquid-crystal state, of less than 1.25, in which the molecules of the liquid-crystal compound are fixed in an alignment state at a mean tilt angle ranging from 35 to 85°, wherein its in-plane retardation Re, as measured in a direction normal to a plane of the optically-anisotropic film for 550 nm-wavelength light, falls within the range from 60 nm to 220 nm.

2. The optically-anisotropic film of claim 1, wherein the discotic liquid-crystal compound is a liquid-crystal compound of a following formula (DI) or a following formula (I):

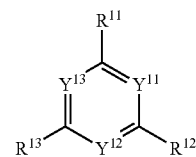

(DI)

wherein $Y^{11}$, $Y^{12}$ and $Y^{13}$ each independently represents a methine or a nitrogen atom; $R^{11}$, $R^{12}$ and $R^{13}$ each independently represents a following formula (DI-A), (DI-B) or (DI-C):

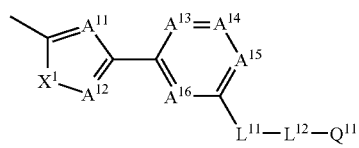

(DI-A)

wherein $A^{11}$, $A^{12}$, $A^{13}$, $A^{14}$, $A^{15}$ and $A^{16}$ each independently represents a methine or a nitrogen atom; $X^1$ represents an oxygen atom, a sulfur atom, a methylene or an imino; $L^{11}$ represents —O—, —O—CO—, —CO—

O—, —O—CO—O—, —S—, —NH—, —SO$_2$—, —CH$_2$—, —CH=CH— or —C≡C—; L$^{12}$ represents a divalent linking group selected from the group consisting of —O—, —S—, —C(=O)—, —SO$_2$—, —NH—, —CH$_2$—, —CH=CH— and —C≡C—, and a combination thereof; when an above group is a group having a hydrogen atom, the hydrogen atom may be substituted with a substituent; Q$^{11}$ independently represents a polymerizable group or a hydrogen atom;

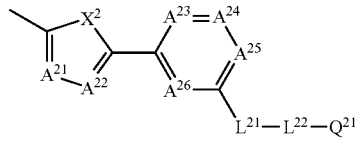

(DI-B)

wherein A$^{21}$, A$^{22}$, A$^{23}$, A$^{24}$, A$^{25}$ and A$^{26}$ each independently represents a methine or a nitrogen atom; X$^2$ represents an oxygen atom, a sulfur atom, a methylene or an imino; L$^{21}$ represents —O—, —O—CO—, —CO—O—, —O—CO—O—, —S—, —NH—, —SO$_2$—, —CH$_2$—, —CH=CH— or —C≡C—; L$^{22}$ represents a divalent linking group selected from the group consisting of —O—, —S—, —C(=O)—, —SO$_2$—, —NH—, —CH$_2$—, —CH=CH— and —C≡C—, and a combination thereof; when an above group is a group having a hydrogen atom, the hydrogen atom may be substituted with a substituent; Q$^{21}$ independently represents a polymerizable group or a hydrogen atom;

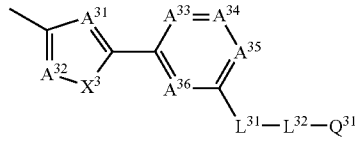

(DI-C)

wherein A$^{31}$, A$^{32}$, A$^{33}$, A$^{34}$, A$^{35}$ and A$^{36}$ each independently represents a methine or a nitrogen atom; X$^3$ represents an oxygen atom, a sulfur atom, a methylene or an imino; L$^{31}$ represents —O—, —O—CO—, —CO—O—, —O—CO—O—, —S—, —NH—, —SO$_2$—, —CH$_2$—, —CH=CH— or —C≡C—; L$^{32}$ represents a divalent linking group selected from the group consisting of —O—, —S—, —C(=O)—, —SO$_2$—, —NH—, —CH$_2$—, —CH=CH— and —C≡C—, and a combination thereof; when an above group is a group having a hydrogen atom, the hydrogen atom may be substituted with a substituent; Q$^{31}$ independently represents a polymerizable group or a hydrogen atom;

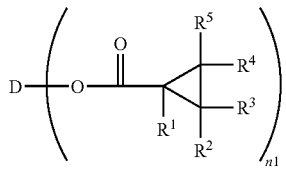

(I)

wherein D represents a triphenylene; n1 indicates an integer of from 3 to 6; R$^1$, R$^2$, R$^3$, R$^4$ and R$^5$ each independently represents a hydrogen atom, a substituted or non-substituted alkyl group having from 1 to 20 carbon atoms, a substituted or non-substituted alkenyl group having from 3 to 20 carbon atoms, a substituted or non-substituted alkoxy group having from 1 to 20 carbon atoms, a substituted or non-substituted alkenyloxy group having from 3 to 20 carbon atoms, a substituted or non-substituted aryl group having from 6 to 20 carbon atoms, a substituted or non-substituted aryloxy group having from 6 to 20 carbon atoms, or a substituted or non-substituted alkoxycarbonyl group having from 1 to 20 carbon atoms.

3. The optically-anisotropic film of claim 1, wherein a ratio, α2, which is a ratio of retardation (Re) at a wavelength of 400 nm to Re at a wavelength of 550 nm is less than 1.25.

4. The optically-anisotropic film of claim 1, which comprises at least a region where the tilt angle of molecules of the liquid-crystal compound in the film varies along a thickness direction of the film.

5. The optically-anisotropic film of claim 1, which comprises at least two layers each formed of the composition, wherein the compositions for forming the at least two layers are the same or different.

6. A liquid-crystal display device comprising at least a liquid-crystal cell and an optically-anisotropic film as set forth in claim 1, which provides a black state while being applied with voltage,
wherein the optically anisotropic film is disposed so that the mean direction of the axes, which are projected on the liquid-crystal cell substrate surface, of the director of the discotic liquid-crystal molecules therein is substantially parallel to the mean direction of the axes, which are projected on the liquid-crystal cell substrate surface, of the director of the liquid-crystal molecules in the liquid-crystal cell in a black state.

7. A liquid-crystal display device comprising a backlight disposed at a backside thereof, a pair of substrates, a liquid-crystal layer held between the pair of substrates and a color filter, with reflective regions and transmissive regions,
wherein an optically-anisotropic film as set forth in claim 1 is disposed between the pair of substrates and in each of the transmissive regions, and retardation of each of the optically-anisotropic film varies depending on the wavelength of the color filter.

8. The liquid-crystal display device of claim 6, wherein the optically-anisotropic film is formed by jetting out a fluid comprising at least one liquid-crystal compound, onto the surface of a substrate and drying it to give a liquid-crystal phase thereon, and fixing an alignment state of the liquid-crystal phase on the substrate.

9. The liquid-crystal display device of claim 7, wherein the optically-anisotropic film is formed by jetting out a fluid comprising at least one liquid-crystal compound, onto the surface of a substrate and drying it to give a liquid-crystal phase thereon, and fixing an alignment state of the liquid-crystal phase on the substrate.

* * * * *